(12) United States Patent
Jablokov et al.

(10) Patent No.: US 9,009,055 B1
(45) Date of Patent: *Apr. 14, 2015

(54) HOSTED VOICE RECOGNITION SYSTEM FOR WIRELESS DEVICES

(71) Applicant: Canyon IP Holdings LLC, Wilmington, DE (US)

(72) Inventors: Victor R. Jablokov, Charlotte, NC (US); Igor R. Jablokov, Charlotte, NC (US); Marc White, Boca Raton, FL (US)

(73) Assignee: Canyon IP Holdings LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/872,928

(22) Filed: Apr. 29, 2013

Related U.S. Application Data

(63) Continuation of application No. 13/372,241, filed on Feb. 13, 2012, now Pat. No. 8,433,574, which is a continuation of application No. 11/697,074, filed on Apr. 5, 2007, now Pat. No. 8,117,268.

(60) Provisional application No. 60/789,837, filed on Apr. 5, 2006.

(51) Int. Cl.
  *G10L 13/06* (2013.01)
  *G10L 13/04* (2013.01)
(52) U.S. Cl.
  CPC .................................. *G10L 13/043* (2013.01)
(58) Field of Classification Search
  USPC .......................................... 704/230, 231, 270
  See application file for complete search history.

(56) References Cited

U.S. PATENT DOCUMENTS

| | | | |
|---|---|---|---|
| 5,675,507 A | 10/1997 | Bobo | |
| 5,974,413 A | 10/1999 | Beauregard et al. | |
| 6,100,882 A * | 8/2000 | Sharman et al. | 704/235 |
| 6,173,259 B1 | 1/2001 | Bijl et al. | |

(Continued)

FOREIGN PATENT DOCUMENTS

| | | |
|---|---|---|
| EP | 1274222 | 1/2003 |
| WO | WO 2006101528 | 9/2006 |

OTHER PUBLICATIONS

Bisani, M., Vozila, P., Divay, O., Adams, J., 2008, Automatic editing in a back-end speech-to-text system, 7 pages.

(Continued)

*Primary Examiner* — Douglas Godbold
(74) *Attorney, Agent, or Firm* — Knobbe Martens Olson & Bear LLP

(57) ABSTRACT

Methods, systems, and software for converting the audio input of a user of a hand-held client device or mobile phone into a textual representation by means of a backend server accessed by the device through a communications network. The text is then inserted into or used by an application of the client device to send a text message, instant message, email, or to insert a request into a web-based application or service. In one embodiment, the method includes the steps of initializing or launching the application on the device; recording and transmitting the recorded audio message from the client device to the backend server through a client-server communication protocol; converting the transmitted audio message into the textual representation in the backend server; and sending the converted text message back to the client device or forwarding it on to an alternate destination directly from the server.

24 Claims, 16 Drawing Sheets

(56) References Cited

U.S. PATENT DOCUMENTS

| | | |
|---|---|---|
| 6,219,407 B1 | 4/2001 | Kanevsky |
| 6,219,638 B1 | 4/2001 | Padmanabhan et al. |
| 6,298,326 B1 * | 10/2001 | Feller .......................... 704/270 |
| 6,453,290 B1 * | 9/2002 | Jochumson ................... 704/231 |
| 6,490,561 B1 | 12/2002 | Wilson et al. |
| 6,532,446 B1 | 3/2003 | King |
| 6,604,077 B2 * | 8/2003 | Dragosh et al. ............ 704/270.1 |
| 6,654,448 B1 | 11/2003 | Agraharam et al. |
| 6,687,339 B2 | 2/2004 | Martin |
| 6,687,689 B1 | 2/2004 | Fung |
| 6,704,034 B1 | 3/2004 | Rodriguez et al. |
| 6,760,700 B2 * | 7/2004 | Lewis et al. ................... 704/235 |
| 6,775,360 B2 | 8/2004 | Davidson |
| 6,816,578 B1 | 11/2004 | Kredo |
| 6,820,055 B2 | 11/2004 | Saindon |
| 6,850,609 B1 * | 2/2005 | Schrage ................... 379/202.01 |
| 6,895,084 B1 | 5/2005 | Saylor |
| 7,013,275 B2 | 3/2006 | Arnold et al. |
| 7,035,804 B2 | 4/2006 | Saindon |
| 7,089,184 B2 | 8/2006 | Rorex |
| 7,133,513 B1 * | 11/2006 | Zhang ...................... 379/202.01 |
| 7,146,320 B2 | 12/2006 | Ju et al. |
| 7,146,615 B1 | 12/2006 | Hervet et al. |
| 7,181,387 B2 | 2/2007 | Ju et al. |
| 7,200,555 B1 | 4/2007 | Ballard et al. |
| 7,206,932 B1 | 4/2007 | Kirchhoff |
| 7,225,224 B2 | 5/2007 | Nakamura |
| 7,233,655 B2 | 6/2007 | Gailey et al. |
| 7,236,580 B1 | 6/2007 | Sarkar et al. |
| 7,254,384 B2 | 8/2007 | Gailey et al. |
| 7,260,534 B2 | 8/2007 | Gandhi et al. |
| 7,280,966 B2 | 10/2007 | Ju et al. |
| 7,302,280 B2 | 11/2007 | Hinckley et al. |
| 7,313,526 B2 | 12/2007 | Roth |
| 7,330,815 B1 * | 2/2008 | Jochumson ................... 704/231 |
| 7,363,229 B2 * | 4/2008 | Falcon et al. ................. 704/275 |
| 7,376,556 B2 | 5/2008 | Bennett |
| 7,392,185 B2 | 6/2008 | Bennett |
| 7,539,086 B2 | 5/2009 | Jaroker |
| 7,555,431 B2 | 6/2009 | Bennett |
| 7,571,100 B2 * | 8/2009 | Lenir et al. ................ 704/270.1 |
| 7,577,569 B2 * | 8/2009 | Roth et al. ..................... 704/260 |
| 7,590,534 B2 * | 9/2009 | Vatland ......................... 704/235 |
| 7,634,403 B2 | 12/2009 | Roth et al. |
| 7,640,158 B2 | 12/2009 | Detlef et al. |
| 7,650,284 B2 | 1/2010 | Cross et al. |
| 7,657,424 B2 | 2/2010 | Bennett |
| 7,668,718 B2 | 2/2010 | Kahn et al. |
| 7,672,841 B2 | 3/2010 | Bennett |
| 7,702,508 B2 | 4/2010 | Bennett |
| 7,716,058 B2 | 5/2010 | Roth et al. |
| 7,725,307 B2 | 5/2010 | Bennett |
| 7,725,321 B2 | 5/2010 | Bennett |
| 7,729,904 B2 | 6/2010 | Bennett |
| 7,729,912 B1 | 6/2010 | Bacchiani et al. |
| 7,757,162 B2 | 7/2010 | Barrus et al. |
| 7,796,980 B1 | 9/2010 | McKinney et al. |
| 7,890,586 B1 | 2/2011 | McNamara et al. |
| 7,899,670 B1 | 3/2011 | Young et al. |
| 7,899,671 B2 | 3/2011 | Cooper et al. |
| 8,027,836 B2 | 9/2011 | Baker et al. |
| 8,032,372 B1 * | 10/2011 | Zimmerman et al. ........ 704/235 |
| 8,050,918 B2 * | 11/2011 | Ghasemi et al. .............. 704/244 |
| 8,106,285 B2 | 1/2012 | Gerl et al. |
| 8,117,268 B2 | 2/2012 | Jablokov |
| 8,135,578 B2 | 3/2012 | HéBert |
| 8,145,493 B2 | 3/2012 | Cross et al. |
| 8,209,184 B1 * | 6/2012 | Dragosh et al. ............ 704/270.1 |
| 8,326,636 B2 | 12/2012 | White |
| 8,335,830 B2 | 12/2012 | Jablokov et al. |
| 8,352,261 B2 | 1/2013 | Terrell, II et al. |
| 8,401,850 B1 * | 3/2013 | Jochumson ................... 704/236 |
| 2002/0029101 A1 | 3/2002 | Larson et al. |
| 2002/0035474 A1 | 3/2002 | Alpdemir |
| 2002/0052781 A1 | 5/2002 | Aufricht et al. |
| 2002/0165719 A1 * | 11/2002 | Wang et al. ................. 704/270.1 |
| 2002/0165773 A1 | 11/2002 | Natsuno |
| 2003/0008661 A1 | 1/2003 | Joyce et al. |
| 2003/0028601 A1 | 2/2003 | Rowe |
| 2003/0050778 A1 | 3/2003 | Nguyen et al. |
| 2003/0101054 A1 | 5/2003 | Davis et al. |
| 2003/0105630 A1 * | 6/2003 | MacGinitie et al. .......... 704/235 |
| 2003/0125955 A1 | 7/2003 | Arnold et al. |
| 2003/0126216 A1 | 7/2003 | Avila et al. |
| 2003/0182113 A1 | 9/2003 | Huang |
| 2003/0200093 A1 * | 10/2003 | Lewis et al. ................... 704/260 |
| 2003/0212554 A1 * | 11/2003 | Vatland ......................... 704/235 |
| 2003/0220798 A1 | 11/2003 | Schmid et al. |
| 2003/0223556 A1 | 12/2003 | Ju et al. |
| 2004/0005877 A1 | 1/2004 | Vaananen |
| 2004/0015547 A1 | 1/2004 | Griffin et al. |
| 2004/0107107 A1 * | 6/2004 | Lenir et al. ................. 704/270.1 |
| 2004/0133655 A1 | 7/2004 | Yen et al. |
| 2004/0151358 A1 | 8/2004 | Yanagita et al. |
| 2004/0176906 A1 | 9/2004 | Matsubara et al. |
| 2005/0010641 A1 * | 1/2005 | Staack .......................... 709/206 |
| 2005/0021344 A1 | 1/2005 | Davis et al. |
| 2005/0027538 A1 | 2/2005 | Halonen et al. |
| 2005/0080786 A1 | 4/2005 | Fish et al. |
| 2005/0101355 A1 | 5/2005 | Hon et al. |
| 2005/0102142 A1 | 5/2005 | Soufflet et al. |
| 2005/0188029 A1 * | 8/2005 | Asikainen et al. ............ 709/206 |
| 2005/0197145 A1 | 9/2005 | Chae et al. |
| 2005/0209868 A1 * | 9/2005 | Wan et al. ......................... 705/1 |
| 2005/0239495 A1 | 10/2005 | Bayne |
| 2005/0240406 A1 | 10/2005 | Carroll |
| 2005/0261907 A1 * | 11/2005 | Smolenski et al. ............ 704/270 |
| 2005/0288926 A1 | 12/2005 | Benco et al. |
| 2006/0052127 A1 | 3/2006 | Wolter |
| 2006/0053016 A1 * | 3/2006 | Falcon et al. ................. 704/257 |
| 2006/0149558 A1 | 7/2006 | Kahn et al. |
| 2006/0161429 A1 * | 7/2006 | Falcon et al. ................. 704/231 |
| 2006/0195541 A1 | 8/2006 | Ju et al. |
| 2006/0217159 A1 * | 9/2006 | Watson .......................... 455/563 |
| 2006/0235695 A1 | 10/2006 | Thrift et al. |
| 2007/0005795 A1 | 1/2007 | Gonzalez |
| 2007/0038740 A1 | 2/2007 | Steeves |
| 2007/0038923 A1 | 2/2007 | Patel |
| 2007/0043569 A1 * | 2/2007 | Potter et al. ................... 704/270 |
| 2007/0061300 A1 | 3/2007 | Ramer et al. |
| 2007/0079383 A1 | 4/2007 | Gopalakrishnan |
| 2007/0086773 A1 * | 4/2007 | Ramsten et al. ............... 396/287 |
| 2007/0106507 A1 * | 5/2007 | Charoenruengkit et al. .. 704/233 |
| 2007/0115845 A1 | 5/2007 | Hochwarth et al. |
| 2007/0118426 A1 | 5/2007 | Barnes |
| 2007/0118592 A1 | 5/2007 | Bachenberg |
| 2007/0123222 A1 | 5/2007 | Cox et al. |
| 2007/0133769 A1 | 6/2007 | Da Palma et al. |
| 2007/0133771 A1 | 6/2007 | Stifelman et al. |
| 2007/0156400 A1 * | 7/2007 | Wheeler ........................ 704/235 |
| 2007/0180718 A1 | 8/2007 | Fourquin et al. |
| 2007/0233487 A1 | 10/2007 | Cohen et al. |
| 2007/0239837 A1 | 10/2007 | Jablokov et al. |
| 2007/0255794 A1 | 11/2007 | Coutts |
| 2008/0016142 A1 | 1/2008 | Schneider |
| 2008/0040683 A1 | 2/2008 | Walsh |
| 2008/0065737 A1 | 3/2008 | Burke et al. |
| 2008/0077406 A1 | 3/2008 | Ganong |
| 2008/0155060 A1 | 6/2008 | Weber et al. |
| 2008/0172781 A1 | 7/2008 | Popowich et al. |
| 2008/0195588 A1 | 8/2008 | Kim et al. |
| 2008/0198980 A1 | 8/2008 | Skakkebaek et al. |
| 2008/0198981 A1 | 8/2008 | Skakkebaek et al. |
| 2008/0208590 A1 | 8/2008 | Cross, Jr. et al. |
| 2008/0243500 A1 | 10/2008 | Bisani et al. |
| 2008/0261564 A1 | 10/2008 | Logan |
| 2008/0275864 A1 | 11/2008 | Kim et al. |
| 2008/0275873 A1 | 11/2008 | Bosarge |
| 2008/0301250 A1 | 12/2008 | Hardy |
| 2009/0012793 A1 | 1/2009 | Dao et al. |
| 2009/0043855 A1 | 2/2009 | Bookstaff et al. |
| 2009/0055175 A1 | 2/2009 | Terrell et al. |
| 2009/0076917 A1 | 3/2009 | Jablokov et al. |
| 2009/0077493 A1 | 3/2009 | Hempel et al. |

(56) References Cited

U.S. PATENT DOCUMENTS

| | | |
|---|---|---|
| 2009/0083032 A1 | 3/2009 | Jablokov et al. |
| 2009/0117922 A1 | 5/2009 | Bell |
| 2009/0124272 A1 | 5/2009 | White et al. |
| 2009/0141875 A1 | 6/2009 | Demmitt et al. |
| 2009/0163187 A1 | 6/2009 | Terrell |
| 2009/0170478 A1 | 7/2009 | Doulton |
| 2009/0182560 A1 | 7/2009 | White |
| 2009/0210214 A1 | 8/2009 | Qian et al. |
| 2009/0228274 A1 | 9/2009 | Terrell et al. |
| 2009/0240488 A1 | 9/2009 | White et al. |
| 2009/0248415 A1 | 10/2009 | Jablokov et al. |
| 2009/0271194 A1 | 10/2009 | Davis et al. |
| 2009/0276215 A1 | 11/2009 | Hager |
| 2009/0282363 A1 | 11/2009 | Jhaveri et al. |
| 2010/0049525 A1 | 2/2010 | Paden |
| 2010/0058200 A1 | 3/2010 | Jablokov et al. |
| 2010/0146077 A1 | 6/2010 | Davies et al. |
| 2010/0180202 A1 | 7/2010 | Del Valle Lopez |
| 2010/0182325 A1 | 7/2010 | Cederwall |
| 2010/0191619 A1 | 7/2010 | Dicker et al. |
| 2010/0278453 A1 | 11/2010 | King |
| 2010/0279667 A1 | 11/2010 | Wehrs et al. |
| 2010/0293242 A1 | 11/2010 | Buccheit et al. |
| 2011/0029876 A1 | 2/2011 | Slotznick et al. |
| 2011/0047452 A1 | 2/2011 | Ativanichayaphong et al. |
| 2011/0161276 A1 | 6/2011 | Krumm et al. |
| 2012/0259729 A1 | 10/2012 | Linden et al. |
| 2013/0158994 A1 | 6/2013 | Jaramillo et al. |

OTHER PUBLICATIONS

Brown, E., et al., Capitalization Recovery for Text, Springer-Verlag Berlin Heidelberg, 2002, 12 pages.

Desilets, A., Bruijn, B., Martin, J., 2002, Extracting keyphrases from spoken audio documents, Springer-Verlag Berlin Heidelberg, 15 pages.

Fielding, R., Jun. 1999, Hypertext Transfer Protocol—HTTP/1.1, RFC 2616, http://www.w3.org, 12 pages.

Glaser et al., Web-based Telephony Bridges for the Deaf, Proc. South African Telecommunications Networks & Applications Conference (2001), Wild Coast Sun, South Africa, 5 pages total.

Gotoh, Y., Renais, S., 2000, Sentence Boundary Detection in Broadcast Speech Transcripts. Proceedings of the ISCA Workshop, 8 pages.

Huang, J., Zweig, G., Padmanabhan, M., 2002, Extracting Caller Information from Voicemail, IBM T.J. Watson Research Center, pp. 67-77.

Huang, J., Zweig, G., 2002, Maximum entropy model for punctuation annotation from speech. In: ICSLP, pp. 917-920.

International Search Report for PCT/US2007/008621 dated Nov. 13, 2007.

Justo, R., Torres, M., 2008, Phrase classes in two-level language models for ASR, Springer-Verlag London Limited, 11 pages.

Kemsley et al., 1992, A Survey of Neural Network Research and Fielded Applications, International Journal of Neural Networks: Research and Applications, vol. 2, No. 2/3/4, pp. 123-133.

Kimura, K. Suzuoka, T., Amano, S., 1992, Association-based natural language processing with neural networks, in proceedings of the $7^{th}$ annual meeting of the Association of Computational Linguistics, pp. 223-231.

Knudsen, Jonathan, 2008, Session Handling in MIDP, http://developers.sun.com/mobility/midp/articles/sessions/, 7 pages.

Lewis et al., SoftBridge: An Architecture for Building IP-based Bridges over the Digital Divide. Proc. South African Telecommunications Networks & Applications Conference (SATNAC 2002), Drakensberg, South Africa, 5 pages total.

Marshall, James, HTTP Made Really Easy, Aug. 15, 1997, http://www.jmarshall.com/easy/http/, 15 pages.

Orion, Mar. 1, 2001, J2EE Application Overview, publicly available on http://www.orionserever.com/docs/j2eeoverview.html.

Ries, K., 2002, Segmenting conversations by topic, initiative, and style, Springer-Verlag Berlin Heidelberg, 16 pages.

Shriberg, E., Stolcke, A., 2000, Prosody-based automatic segmentation of speech into sentences and topics, 31 pages.

Thomae, M., Fabian, T., Lieb, R. Ruske, G., 2005, Hierarchical Language Models for One-Stage Speech Interpretation, in Interspeech-2005, 3425-3428.

Transl8it! Translation engine, Oct. 26, 2007, htt;://www.trans!8it.com, 5 pages.

vBulletin Community Forum, thread posted Mar. 5, 2004, 5 pages.

\* cited by examiner

HOSTED VOICE RECOGNITION SYSTEM FOR WIRELESS DEVICES

CROSS-REFERENCE TO RELATED PATENT APPLICATIONS

The present application is a continuation of U.S. patent application Ser. No. 13/372,241, filed on Feb. 13, 2012, which published as U.S. Patent Pub. No. 2012/0166199 on Jun. 28, 2012, and will issue on Apr. 30, 2013. The '241 application is a U.S. continuation patent application of, and claims priority under 35 U.S.C. §120 to, U.S. nonprovisional patent application Ser. No. 11/697,074, filed Apr. 5, 2007, which nonprovisional patent application published as U.S. patent application publication no. 2007/0239837, and issued as U.S. Pat. No. 8,117,268 on Feb. 14, 2012, which patent application, any patent application publications thereof, and any patents issuing therefrom are incorporated by reference herein, and which '074 application is a U.S. nonprovisional patent application of, and claims priority under 35 U.S.C. §119(e) to, U.S. provisional patent application No. 60/789,837, filed filed Apr. 5, 2006, entitled "Apparatus And Method For Converting Human Speech Into A Text Or Email Message In A Mobile Environment Using Grammar Or Transcription Based Speech Recognition Software Which Optionally Resides On The Internet," By Victor R. Jablokov, which is incorporated herein by reference in its entirety.

FIELD OF THE INVENTION

The present invention relates generally to signal processing and, more particularly, to systems, methods, and thin client software installed on mobile or hand-held devices that enables a user to create an audio message that is converted into a text message or an actionable item at a remote, back end server.

BACKGROUND OF THE INVENTION

In 2005, over one trillion text messages were sent by users of mobile phones and similar hand-held devices worldwide. Text messaging usually involves the input of a text message by a sender or user of the hand-held device, wherein the text message is generated by pressing letters, numbers, or other keys on the sender's mobile phone. Email enabled devices, such as the Palm Treo or RIM Blackberry, enable users to generate emails quickly, in a similar manner. Further, such devices typically also have the capability of accessing web pages or information on the Internet. Searching for a desired web page is often accomplished by running a search on any of the commercially available search engines, such as google.com, msn.com, yahoo.com, etc.

Unfortunately, because such devices make it so easy to type in a text-based message for a text message, email, or web search, it is quite common for users to attempt to do so when the user of the hand-held device actually needed to focus his attention or hands on another activity, such as driving. Beyond those more capable hand-helds, the vast majority of the market is comprised of devices with small keypads and screens, making text entry even more cumbersome, whether the user is fixed or mobile. In addition, it would be advantageous for visually impaired people to be able to generate a text-based message without having to type in the message into the hand-held device or mobile phone. For these and for many other reasons, there has been a need in the mobile and hand-held device industry for users to be able to dictate a message and have that message converted into text. Such text can then be sent back to the user of the device for sending in a text message, email, or web application. Alternatively, such text message can be used to cause an action to be taken that provides an answer or other information, not just a text version of the audio, back to the user of the device.

Some currently available systems in the field have attempted to address these needs in different ways. For example, one system has used audio telephony channels for transmission of audio information. A drawback to this type of system is that it does not allow for synchronization between visual and voice elements of a given transaction in the user interface on the user's device, which requires the user, for example, to hang up her mobile phone before seeing the recognized results. Other systems have used speaker-dependent or grammar-based systems for conversion of audio into text, which is not ideal because that requires each user to train the system on her device to understand her unique voice or utterances could only be compared to a limited domain of potential words—neither of which is feasible or desirable for most messaging needs or applications. Finally, other systems have attempted to use voice recognition or audio to text software installed locally on the handheld devices. The problem with such systems is that they typically have low accuracy rates because the amount of memory space on hand-held devices necessarily limits the size of the dictionaries that can be loaded therein. In addition, voice recognition software installed on the hand-held typically cannot dynamically morph to handle new web services as they appear, a tremendous benefit of server-based solutions.

Thus, there remains a need in the industry for systems, methods, and thin-client software solutions that enable audio to be captured on a hand-held device, can display text results back in real time or near real time, is speaker independent so that any customer can use it immediately without having to train the software to recognize the specific speech of the user, uses the data channel of the device and its communication systems so that the device user is able to interact with the system without switching context, uses a backend server-based processing system so that it can process free form messages, and also has the ability to expand its capabilities to interact with new use cases/web services in a dynamic way.

Therefore, a number of heretofore unaddressed needs exist in the art to address the aforementioned deficiencies and inadequacies.

SUMMARY OF THE INVENTION

A first aspect of the present invention relates to a method for converting an audio message into a text message using a hand-held client device in communication with a backend server. In one embodiment, the method includes the steps of initializing the client device so that the client device is capable of communicating with the backend server; recording an audio message in the client device; transmitting the recorded audio message from the client device to the backend server through a client-server communication protocol; converting the transmitted audio message into the text message in or at the backend server; and sending the converted text message back to the client device for further use or processing. The text message comprises an SMS text message.

The backend server has a plurality of applications. In one embodiment, the backend server has an ad filter, SMS filter, obscenity filter, number filter, date filter, and currency filter. In one embodiment, the backend server comprises a text-to-speech engine (TTS) for generating a text message based on an original audio message.

The client device has a microphone, a speaker and a display. In one embodiment, the client device includes a keypad having a plurality of buttons, which may be physical or touchscreen, configured such that each button is associated with one of the plurality of applications available on the client device. The client device preferably also includes a user interface (UI) having a plurality of tabs configured such that each tab is associated with a plurality of user preferences. In one embodiment, the client device is a mobile phone or PDA or similar multi-purpose, multi-capability hand-held device.

In one embodiment, the client-server communication protocol is HTTP or HTTPS. The client-server communication is through a communication service provider of the client device and/or the Internet.

Preferably, the method includes the step of forwarding the converted text message to one or more recipients or to a device of the recipient.

Preferably, the method also includes the step of displaying the converted text message on the client device.

Additionally, the method may include the step of displaying advertisements, logos, icons, or hyperlinks on the client device according to or based on keywords contained in the converted text message, wherein the keywords are associated with the advertisements, logos, icons, or hyperlinks.

The method may also include the steps of locating the position of the client device through a global positioning system (GPS) and listing locations, proximate to the position of the client device, of a target of interest presented in the converted text message.

In one embodiment, the step of initializing the client device includes the steps of initializing or launching a desired application on the client device and logging into a client account at the backend server from the client device. The converting step is performed with a speech recognition algorithm, where the speech recognition algorithm comprises a grammar algorithm and/or a transcription algorithm.

In another aspect, the present invention relates to a method for converting an audio message into a text message. In one embodiment, the method includes the steps of initializing a client device so that the client device is capable of communicating with a backend server; speaking to the client device to create a stream of an audio message; simultaneously transmitting the audio message from the client device to a backend server through a client-server communication protocol; converting the transmitted audio message into the text message in the backend server; and sending the converted text message back to the client device.

The method further includes the step of forwarding the converted text message to one or more recipients.

The method also include the step of displaying the converted text message on the client device.

Additionally, the method may includes the step of displaying advertising messages and/or icons on the client device according to keywords containing in the converted text message, wherein the keywords are associated with the advertising messages and/or icons.

The method may also includes the steps of locating the position of the client device through a global positioning system (GPS); and listing locations, proximate to the position of the client device, of a target of interest presented in the converted text message.

In yet another aspect, the present invention relates to a method for converting an audio message into a text message. In one embodiment, the method includes the steps of transmitting an audio message from a client device to a backend server through a client-server communication protocol; and converting the audio message into a text message in the backend server.

In one embodiment, the method also includes the steps of initializing the client device so that the client device is capable of communicating with the backend server; and creating the audio message in the client device.

The method further includes the steps of sending the converted text message back to the client device; and forwarding the converted text message to one or more recipients.

Additionally, the method includes the step of displaying the converted text message on the client device.

In one embodiment, the converting step is performed with a speech recognition algorithm. The speech recognition algorithm comprises a grammar algorithm and/or a transcription algorithm.

In a further aspect, the present invention relates to software stored on a computer readable medium for causing a client device and/or a backend server to perform functions comprising: establishing communication between the client device and the backend server; dictating an audio message in the client device; transmitting the audio message from the client device to the backend server through the established communication; converting the audio message into the text message in the backend server; and sending the converted text message back to the client device.

In one embodiment, the software includes a plurality of web applications. Each of the plurality of web applications is a J2EE application.

In one embodiment, the functions further comprise directing the converted text message to one or more recipients. Additionally, the functions also comprise displaying the converted text message on the client device. Moreover, the functions comprise displaying advertising messages and/or icons on the client device according to keywords containing in the converted text message, wherein the keywords are associated with the advertising messages and/or icons. Furthermore, the functions comprise listing locations, proximate to the position of the client device, of a target of interest presented in the converted text message.

In yet a further aspect, the present invention relates to a system for converting an audio message into a text message. In one embodiment, the system has a client device; a backend server; and software installed in the client device and the backend server for causing the client device and/or the backend server to perform functions. The functions include establishing communication between the client device and the backend server; dictating an audio message in the client device; transmitting the audio message from the client device to the backend server through the established communication; converting the audio message into the text message in the backend server; and sending the converted text message back to the client device.

In one embodiment, the client device comprises a microphone, a speaker and a display. The client device comprises a mobile phone. The backend server comprises a database.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
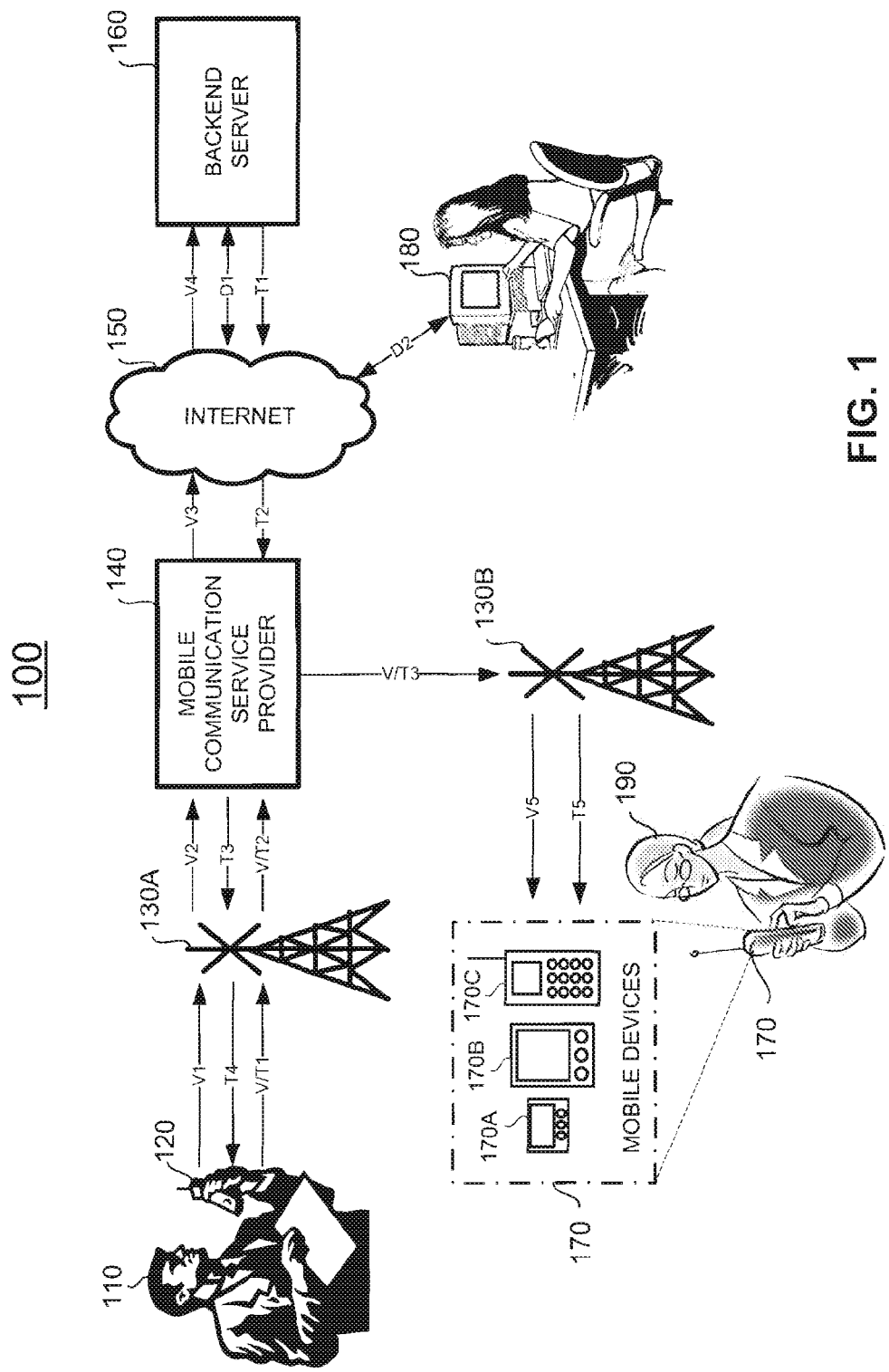
FIG. 1 shows schematically a component view of a system according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings of FIGS. 1-9, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. For convenience, certain terms may be highlighted, for example using italics and/or quotation marks. The use of highlighting has no influence on the scope and meaning of a term; the scope and meaning of a term is the same, in the same context, whether or not it is highlighted. Additionally, some terms used in this specification are more specifically defined below.

As used herein, the term "speech recognition" refers to the process of converting a speech (audio) signal to a sequence of words (text messages), by means of an algorithm implemented as a computer program. Speech recognition applications that have emerged over the last few years include voice dialing (e.g., Call home), call routing (e.g., I would like to make a collect call), simple data entry (e.g., entering a credit card number), preparation of structured documents (e.g., a radiology report), and content-based spoken audio search (e.g. find a podcast where particular words were spoken).

As used herein, the term "servlet" refers to an object that receives a request and generates a response based on the request. Usually, a servlet is a small Java program that runs within a Web server. Servlets receive and respond to requests from Web clients, usually across HTTP and/or HTTPS, the HyperText Transfer Protocol.

Further, some references, which may include patents, patent applications and various publications, are cited and discussed previously or hereinafter in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

The description will be made as to the embodiments of the present invention in conjunction with the accompanying drawings of FIGS. 1-9. In accordance with the purposes of this invention, as embodied and broadly described herein, this invention, in one aspect, relates to a system for converting an audio message into a text message.

Referring now to FIG. 1, a component view of the system 100 is shown according to one embodiment of the present invention. The system 100 includes a mobile phone (or hand-held device or client device) 120 and a backend server 160 in communication with the mobile phone 120 via a mobile communication service provider 140 and the Internet 150. The client device 120 is conventional and has a microphone, a speaker and a display.

A first transceiver tower 130A is positioned between the hand-held device 120 (or the user 110 of the device 120) and the mobile communication service provider 140, for receiving and transmitting audio messages (V1, V2), text messages (T3, T4) and/or verified text messages (V/T1, V/T2) between the mobile phone 120 and the mobile communication service provider 140. A second transceiver tower 130B is positioned between the mobile communication service provider 140 and one of a specified mobile device 170 of a recipient 190, for receiving a verified text message (V/T3) from the mobile communication service provider 140 and transmitting it (V5 and T5) to the mobile device 170. Each of the mobile devices 170 of the recipient 190 are adapted for receiving a conventional text message (T5) converted from an audio message created in the mobile phone 120. Additionally, one or more of the mobile devices 170 are also capable of receiving an audio message (V5) from the mobile phone 120. The mobile device 170 can be, but is not limited to, any one of the following types of devices: a pager 170A, a palm PC or other PDA device (e.g., Treo, Blackberry, etc.) 170B, and a mobile phone 170C. The client device 120 can be a similar types of device, as long as it has a microphone to capture audio from the user and a display to display back text messages.

The system 100 also includes software, as disclosed below in greater detail, installed on the mobile device 120 and the backend server 160 for enabling the mobile phone 120 and/or the backend server 160 to perform the following functions. The first step is to initialize the mobile phone 120 to establish communication between the mobile phone 120 and the backend server 160, which includes initializing or launching a desired application on the mobile phone 120 and logging into a user account in the backend server 160 from the mobile phone 120. This step can be done initially, as part of, or substantially simultaneously with the sending of the recorded audio message V1 described hereinafter. In addition, the process of launching the application may occur initially and then the actual connection to the backend server may occur separately and later in time. To record the audio, the user 110 presses and holds one of the Yap9 buttons of the mobile phone 120, speaks a request (generating an audio message, V1). In the preferred embodiment, the audio message V1 is recorded and temporarily stored in memory on the mobile phone 120. The recorded audio message V1 is then sent to the backend server 160 through the mobile communication service provider 140, preferably, when the user releases the pressed Yap9 button.

In the embodiment of the present invention, as shown in FIG. 1, the recorded audio message V1 is first transmitted to the first transceiver tower 130A from the mobile phone 120. The first transceiver tower 130A outputs the audio message V1 into an audio message V2 that is, in turn, transmitted to the mobile communication service provider 140. Then the mobile communication service provider 140 outputs the audio message V2 into an audio message V3 and transmits it (V3) through the Internet 150, which results in audio message V4 being transmitted to the backend server 160. For all intents and purposes, the relevant content of all the audio messages V1-V4 is identical.

The backend server 160 receives audio message V4 and converts it into a text message T1 and/or a digital signal D1. The conversion process is handled by means of conventional, but powerful speech recognition algorithms, which preferably include a grammar algorithm and a transcription algorithm. The text message T1 and the digital signal D1 correspond to two different formats of the audio message V4. The text message T1 and/or the digital signal D1 are sent back through the Internet 150 that outputs them as text message T2 and digital signal D2, respectively.

Optionally, the digital signal D2 is then transmitted to an end user 180 with access to a conventional computer. In this scenario, the digital signal D2 represents, for example, an instant message or email that is communicated to the end user 180 (or computer of the end user 180) at the request of the user 110. It should be understood that, depending upon the configuration of the backend server 160 and software installed on the client device 120 and potentially based upon the system set up or preferences of the user 110, the digital signal D2 can either be transmitted directly from the backend server 160 or it can be provided back to the client device 120 for review and acceptance by the user 110 before it is then sent on to the end user 180.

The text message T2 is sent to the mobile communication service provider 140, which outputs text message T2 as text message T3. The output text message T3 is then transmitted to the first transceiver tower 130A. The first transceiver tower 130A then transmits it (T3) to the mobile phone 120 in the form of a text message T4. It is noted that the substantive content of all the text messages T1-T4 is identical, which are the corresponding text form of the audio messages V1-V4.

Upon receiving the text message T4, the user 110 optionally verifies the text message and then sends the verified text message V/T1 to the first transceiver tower 130A, which, in turn, transmits it to the mobile communication service provider 140 in the form of a verified text V/T2. The verified text V/T2 is transmitted to the second transceiver tower 130B in the form of a verified text V/T3 from the mobile communication service provider 140. Then, the transceiver tower 130B transmits the verified text V/T3 to the appropriate, recipient mobile device 170.

In an alternative embodiment, the audio message is simultaneously transmitted to the backend server 160 from the mobile phone 120, when the user 110 speaks to the mobile phone 120. In this circumstance, no audio message is recorded in the mobile phone 120. This embodiment enables the user to connect directly to the backend server 160 and record the audio message directly in memory associated with or connected to the backend server 160, which then converts the audio to text, as described above.

Another aspect of the present invention relates to a method for converting an audio message into a text message. In one embodiment, the method has the following steps. At first, a client device is initialized so that the client device is capable of communicating with a backend server. Second, a user speaks to the client device so as to create a stream of an audio message. The audio message can be recorded and then transmitted to the backend server, or the audio message is simultaneously transmitted the backend server through a client-server communication protocol. The transmitted audio message is converted into the text message in the backend server. The converted text message is then sent back to the client device. Upon the user's verification, the converted text message is forwarded to one or more recipients.

The method also includes the step of displaying the converted text message on the client device.

Additionally, the method includes the step of displaying advertisements, logos, icons, or hyperlinks on the client device according to keywords containing in the converted text message, wherein the keywords are associated with the advertisements, logos, icons, or hyperlinks.

Optionally, the method also includes the steps of locating the position of the client device through a global positioning system (GPS); and listing locations, proximate to the position of the client device, of a target of interest presented in the converted text message.

An alternative aspect of the present invention relates to software that causes the client device and the backend server to perform the above functions so as to convert an audio message into a text message.

Without intent to limit the scope of the invention, exemplary architecture and flowcharts according to the embodiments of the present invention are given below. Note that titles or subtitles may be used in the examples for convenience of a reader, which in no way should limit the scope of the invention.

System Architecture

Servlets Overview

The system web application is preferably a J2EE application built using Java 5. It is designed to be deployed on an application server like IBM WebSphere Application Server or an equivalent J2EE application server. It is designed to be platform neutral, meaning the server hardware and operating system (OS) can be anything supported by the web application server (e.g. Windows, Linux, MacOS X).

The system web application currently includes 9 servlets: Correct, Debug, Install, Login, Notify, Ping, Results, Submit, and TTS. Each servlet is discussed below in the order typically encountered.

The communication protocol preferably used for messages between the thin client system and the backend server applications is HTTP and HTTPS. Using these standard web protocols allows the system web application to fit well in a web application container. From the application server's point of view, it cannot distinguish between the thin client system midlet and a typical web browser. This aspect of the design is intentional to convince the web application server that the thin client system midlet is actually a web browser. This allows a user to use features of the J2EE web programming model like session management and HTTPS security. It is also a key feature of the client as the MIDP specification requires that clients are allowed to communicate over HTTP.

Install Process

Users 110 can install the thin client application of the client device 120 in one of the following three ways:
  (i). By initiating the process using a web browser on their PC, or
  (ii). By using the phone's WAP browser to navigate to the install web page, or
  (iii). By sending a text message to the system's shortcode with a link to the install web page.

Using the first approach, the user would enter their phone number, phone model and carrier into the system's web page. They would then receive a text message with an HTTP link to install the midlet.

Using the second approach, the user would navigate to the installer page using their WAP browser and would need to enter their phone number and carrier information using the phone's keypad before downloading the midlet.

Using the third approach, the user would compose a text message and send a request to a system shortcode (e.g. 41411). The text message response from the servers would include the install web site's URL.

In all cases, there are a number of steps involved to correctly generate and sign the midlet for the phone, which is accomplished using the Install servlet.

Installing a midlet onto a phone or hand-held device requires two components: the midlet jar and a descriptor jad file. The jad file is a plain text file which contains a number of standard lines describing the jar file, features used by the midlet, certificate signatures required by the carriers as well as any custom entries. These name/value pairs can then be accessed at runtime by the midlet through a standard java API, which is used to store the user's phone number, user-agent and a number of other values describing the server location, port number, etc.

When the user accesses the installer JSP web page, the first step is to extract the user-agent field from the HTTP headers. This information is used to determine if the user's phone is compatible with the system application.

The next step is to take the user's information about their carrier and phone number and create a custom jar and jad file to download to the phone. Each carrier (or provider) requires a specific security certificate to be used to sign the midlet.

Inside the jar file is another text file called MANIFEST.MF which contains each line of the jad file minus a few lines like the MIDlet-Jar-Size and the MIDlet-Certificate. When the jar file is loaded onto the user's mobile phone 120, the values of the matching names in the manifest and jad file are compared and if they do not match the jar file will fail to install. Since the system dynamically creates the jad file with a number of custom values based on the user's input, the system must also dynamically create the MANIFEST.MF file as well. This means extracting the jar file, modifying the manifest file, and repackaging the jar file. During the repackaging process, any resources which are not needed for the specific phone model can be removed at that time. This allows a user to build a single jar file during development which contains all of the resources for each phone type supported (e.g., different sizes of graphics, audio file formats, etc) and then remove the resources which are not necessary based on the type of phone for each user.

At this point the user has a jar file and now just need to sign it using the certificate for the user's specific carrier. Once completed, the user has a unique jad and jar file for the user to install on their phone.

This is a sample of the jad file, lines in bold are dynamically generated for each user:
Connection: close
Content-Language: en-US
MIDlet-1: Yap,,com.yap.midlet.Start
MIDlet-Install-Notify:
http://www.icynine.com:8080/Yap/Notify
MIDlet-Jar-Size: 348999
MIDlet-Jar-URL: Yap.jar?n=1173968775921
MIDlet-Name: Yap
MIDlet-Permissions:
javax.microedition.io.Connector.http,javax.microedition.io.Connector.sms,javax.microedition.pim.ContactList.read, javax .wireless.messaging.sms.send,javax.wireless.messaging.sms.receive, javax.microedition.media.control.RecordControl,javax .microedition.io.PushRegistry, javax.microedition.location.Location
MIDlet-Permissions-Opt:
javax.microedition.io.Connector.https,javax.microedition-.location. ProximityListener,javax.microedition.location-.Orientation, javax.microedition.location-.LandmarkStore.read
MIDlet-Push-1: sms://:10927, com.yap.midlet.Start, *
MIDlet-Vendor: Yap Inc.
MIDlet-Version: 0.0.2
MicroEdition-Configuration: CLDC-1.1
MicroEdition-Profile: MIDP-2.0
User-Agent: Motorola-V3m Obigo/Q04C1 MMP/2.0 Profile/MIDP-2.0
Configuration/CLDC-1.1
Yap-Phone-Model: KRZR
Yap-Phone-Number: 7045551212
Yap-SMS-Port: 10927
Yap-Server-Log: 1
Yap-Server-Port: 8080
Yap-Server-Protocol: http
Yap-Server-URL: www.icynine.com
Yap-User-ID: 0000
MIDlet-Jar-RSA-SHA1:
gYj7z6NJPb7bvDsajmIDaZnX1WQr9+
f4etbFaBXegwFAOSjElttlO/RkuIe FxvOnBh20o/mtkZA9+
xKnB68GjDGzMlYik6WbC1G8hJgiRcDGt=
MIDlet-Certificate-1-1:
MIIEvzCCBCigAwIBAgIQQZGhWj14389JZWY4HUx1
wjANBgkqhkiG9w0BAQU
FADBfMQswCQYDVQQUGA1E1MjM1OTU5WjCBtDE
LMAkGA1UEBhMCVVMxFzAVB gNVBAoTD1
MIDlet-Certificate-1-2:
MIIEvzCCBCigAwIBAgIQQZGhWj14389JZWY4HUx1
wjANBgkqhkiG9w0BAQU
FADBfMQswCQYDVQQE1MjM1OTU5WjCBtDELMA
kGA1UEBhMCVVMxFzAVBgNVB AoTD1

Client/Server Communication

The thin client system preferably communicates with the system web application using HTTP and/or HTTPS. Specifically, it uses the POST method and custom headers to pass values to the server. The body of the HTTP message in most cases is irrelevant with the exception of when the client device 120 submits audio data to the backend server 160, in which case the body contains the binary audio data.

The backend server 160 responds with an HTTP code indicating the success or failure of the request and data in the body which corresponds to the request being made. It is important to note that the backend server typically cannot depend on custom header messages being delivered to the client device 120 since mobile carriers 140 can, and usually do, strip out unknown header values.

This is a typical header section of an HTTP request from the thin client system:
POST /Yap/Login HTTP/1.1
Host: www.icynine.com:8080
User-Agent: Motorola-V3m Obigo/Q04C1 MMP/2.0 Profile/MIDP-2.0

Accept:
application/xhtml+xml,text/html;q=0.9,text/plain;q=0.8,
imag e/png,*/*;q=0.5
Accept-Language: en-us,en;q=0.5
Accept-Encoding: gzip,deflate
Accept-Charset: ISO-8859-1,utf-8;q=0.7,*;q=0.7
Yap-Phone-Number: 15615551234
Yap-User-ID: 1143
Yap-Version: 1.0.3
Yap-Audio-Record: amr
Yap-Audio-Play: amr
Connection: close When a client is installed, the install fails, or the install is canceled by the user, the Notify servlet is sent a message by the mobile phone 120 with a short description. This can be used for tracking purposes and to help diagnose any install problems.

Usage Process—Login

When the system midlet is opened, the first step is to create a new session by logging into the system web application using the Login servlet. The Login servlet establishes a new session and creates a new User object which is stored in the session.

Sessions are typically maintained using client-side cookies, however, a user cannot rely on the set-cookie header successfully returning to the thin client system because the mobile carrier may remove that header from the HTTP response. The solution to this problem is to use the technique of URL rewriting. To do this, the session id is extracted from the session API, which is returned to the client in the body of the response. For purposes of this invention, this will be called a "Yap Cookie" and is used in every subsequent request from the client. The Yap Cookie looks like this:

;jsessionid=C2403217F2351E3C420A59930878371A

All requests from the client simply append this cookie to the end of each request and the session is maintained:

/Yap/Submit;
jsessionid=C240B217F2351E3C420A599B0878371A

Usage Process—Submit

Preferably, the user 110 then presses and holds one of the Yap9 buttons on client device 120, speaks a request, and releases the button. The recorded audio is sent to the Submit servlet, which returns a unique receipt that the client can use later to identify this utterance.

One of the header values sent to the backend server during the login process is the format that the device records in. That value is stored in the session so the Submit servlet knows how to convert the audio into a format required by the speech recognition engine. This is done in a separate thread, as the process can take some time to complete.

The Yap9 button and Yap9 screen numbers are passed to the Submit server in the HTTP request header. These values are used to lookup a user-defined preference of what each button is assigned to. For example, the 1 button may be used to transcribe audio for an SMS message, while the 2 button is designated for a grammar based recognition to be used in a web services location based search. The Submit servlet determines the appropriate "Yaplet" to use. When the engine has finished transcribing the audio or matching it against a grammar, the results are stored in a hash table in the session.

In the case of transcribed audio for an SMS text message, a number of filters can be applied to the text returned from the speech engine. These include:

Ad Filter—Used to scan the text and identify keywords that can be used to insert targeted advertising messages, and/or convert the keywords into hyperlinks to ad sponsored web pages (e.g. change all references from coffee to "Starbucks").

SMS Filter—Used to convert regular words into a spelling that more closely resembles an SMS message. (e.g., "don't forget to smile"→"don't 4get 2:)", etc.)

Obscenity Filter—Used to place asterisks in for the vowels in street slang. (e.g., "sh*t", "f*ck", etc.)

Number Filter—Used to convert the spelled out numbers returned from the speech engine into a digit based number. (e.g., "one hundred forty seven"→"147".)

Date Filter—Used to format dates returned from the speech engine into the user's preferred format. (e.g., "fourth of march two thousand seven"→"3/4/2007".)

Currency Filter—Used to format currency returned from the speech engine into the user's preferred format. (e.g., "one hundred twenty bucks"→"$120.00".)

After all of the filters are applied, both the filtered text and original text are returned to the client so that if text to speech is enabled for the user, the original unfiltered text can be used to generate the TTS audio.

Usage Process—Results

The client retrieves the results of the audio by taking the receipt returned from the Submit servlet and submitting it to the Results servlet. This is done in a separate thread on the device and has the option of specifying a timeout parameter, which causes the request to return after a certain amount of time if the results are not available.

The body of the results request contains a serialized Java Results object. This object contains a number of getter functions for the client to extract the type of results screen to advance to (i.e., SMS or results list), the text to display, the text to be used for TTS, any advertising text to be displayed, an SMS trailer to append to the SMS message, etc.

Usage Process—TTS

The user may choose to have the results read back via Text to Speech. This can be an option the user could disable to save network bandwidth, but adds value when in a situation where looking at the screen is not desirable, like when driving.

If TTS is used, the TTS string is extracted from the Results object and sent via an HTTP request to the TTS servlet. The request blocks until the TTS is generated and returns audio in the format supported by the phone in the body of the result. This is performed in a separate thread on the device since the transaction may take some time to complete. The resulting audio is then played to the user through the AudioService object on the client.

Usage Process—Correct

As a means of tracking accuracy and improving future SMS based language models, if the user makes a correction to transcribed text on the phone via the keypad before sending the message, the corrected text is submitted to the Correct servlet along with the receipt for the request. This information is stored on the server for later use in analyzing accuracy and compiling a database of typical SMS messages.

Usage Process—Ping

Typically, web sessions will timeout after a certain amount of inactivity. The Ping servlet can be used to send a quick message from the client to keep the session alive.

Usage Process—Debug

Used mainly for development purposes, the Debug servlet sends logging messages from the client to a debug log on the server.

User Preferences

In one embodiment, the system website has a section where the user can log in and customize their thin client system preferences. This allows them to choose from available Yaplets and assign them to Yap9 keys on their phone. The user preferences are stored and maintained on the server and accessible from the system web application. This frees the thin client system from having to know about all of the different back-end Yapplets. It just records the audio, submits it to the backend server along with the Yap9 key and Yap9 screen used for the recording and waits for the results. The server handles all of the details of what the user actually wants to have happen with the audio.

The client needs to know what type of format to present the results to the user. This is accomplished through a code in the Results object. The majority of requests fall into one of two categories: sending an SMS message, or displaying the results of a web services query in a list format. Although these two are the most common, the system architecture supports adding new formats.

System Protocol Details are listed in Tables 1-7.

TABLE 1

Login

| Request Headers | Request Body | Response Body |
| --- | --- | --- |
| User-Agent<br>Content-Language<br>Yap-Phone-Number<br>Yap-User-ID<br>Yap-Version<br>Yap-Audio-Play<br>Yap-Audio-Record | N/A | Yap<br>Session<br>Cookie |

TABLE 2

Submit

| Request Headers | Request Body | Response Body |
| --- | --- | --- |
| User-Agent<br>Content-Language<br>Yap-Phone-Number<br>Yap-User-ID<br>Yap-Version<br>Yap-9-Screen<br>Yap-9-Button<br>Content-Type<br>Content-Length | Binary<br>Audio Data | Submit<br>Receipt |

TABLE 3

Response

| Request Headers | Request Body | Response Body |
| --- | --- | --- |
| User-Agent<br>Content-Language<br>Yap-Phone-Number<br>Yap-User-ID<br>Yap-Version<br>Yap-Results-Receipt<br>Yap-Results-Timeout | N/A | Results<br>Object |

TABLE 4

Correct

| Request Headers | Request Body | Response Body |
| --- | --- | --- |
| User-Agent<br>Content-Language<br>Yap-Phone-Number<br>Yap-User-ID<br>Yap-Version<br>Yap-Results-Receipt<br>Yap-Correction | N/A | N/A |

TABLE 5

TTS

| Request Headers | Request Body | Response Body |
| --- | --- | --- |
| User-Agent<br>Content-Language<br>Yap-Phone-Number<br>Yap-User-ID<br>Yap-Version<br>Yap-TTS-String | N/A | Binary<br>Audio Data |

TABLE 6

Ping

| Request Headers | Request Body | Response Body |
| --- | --- | --- |
| User-Agent<br>Content-Language<br>Yap-Phone-Number<br>Yap-User-ID<br>Yap-Version | N/A | N/A |

TABLE 7

Debug

| Request Headers | Request Body | Response Body |
| --- | --- | --- |
| User-Agent<br>Content-Language<br>Yap-Phone-Number<br>Yap-User-ID<br>Yap-Version<br>Yap-Debug-Msg | N/A | N/A |

Figure 2:
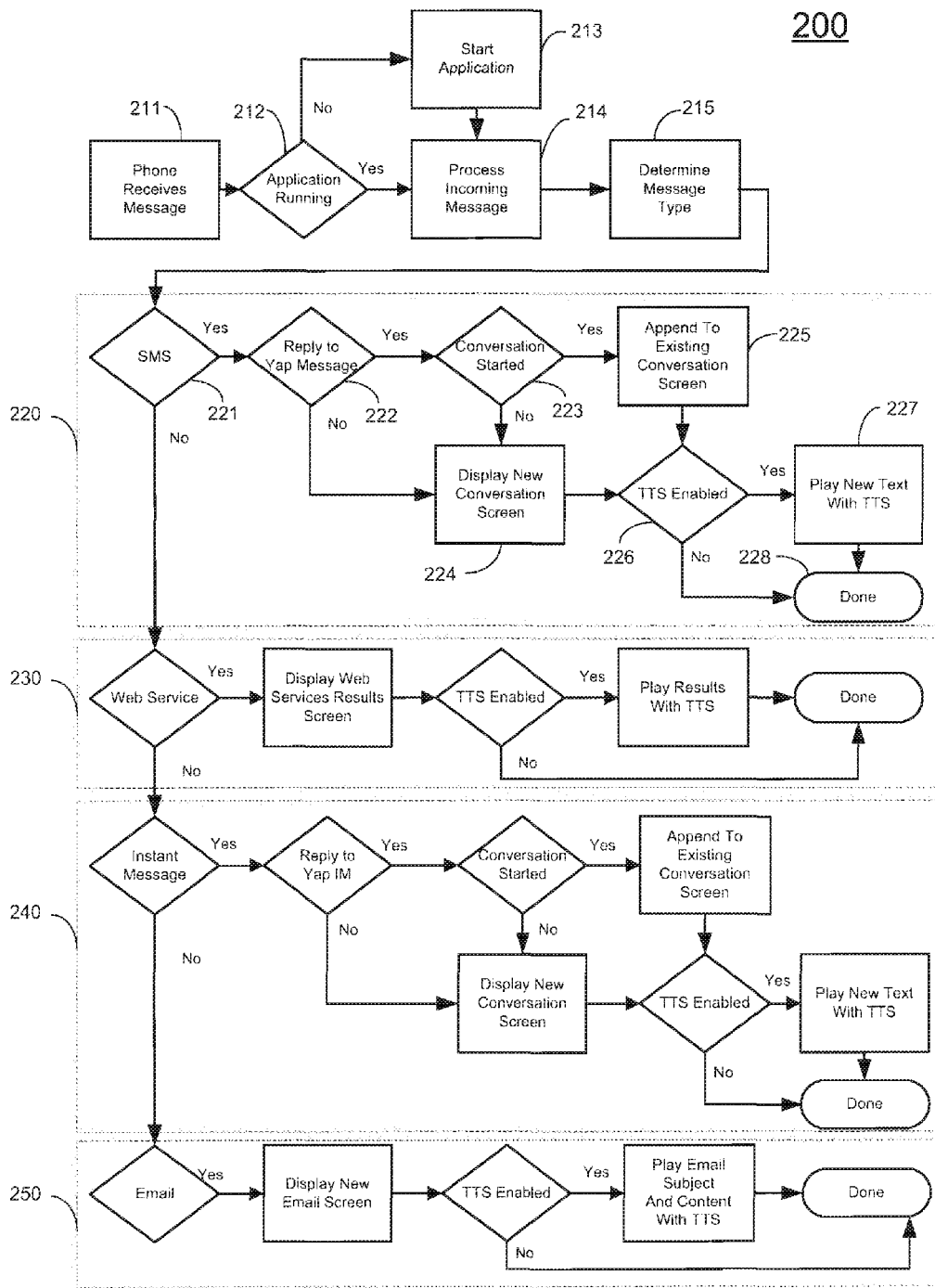
FIG. 2 shows a flowchart of receiving messages of the system according to one embodiment of the present invention.

Referring to FIG. 2, a flowchart 200 of receiving an SMS, an instant message (IM), email or web service for a client device (e.g., mobile phone) is shown according to one embodiment of the present invention. When the phone receives a message (step 211), system application running status is checked (step 212). If the system application is running, it will process the incoming message (step 214). Otherwise, the phone starts the system application (step 213), then processes the incoming message (step 214). The next step (215) is to determine the type of the incoming message. Blocks 220, 230, 240 and 250 are the flowchart of processing an SMS message, a web service, an instant message and an email, respectively, of the incoming message.

For example, if the incoming message is determined to be an SMS (step 221), it is asked whether to reply to system message (step 222). If yes, it is asked whether a conversation is started (step 223), otherwise, it displays a new conversation screen (step 224). If the answer to whether the conversation is started (step 223) is no, it displays the new conversation screen (step 224) and asking whether the TTS is enabled (step 226), and if the answer is yes, the conversation is appended to the existing conversation screen (225). Then the system asks whether the TTS is enabled (step 226), if the answer is yes, it plays new text with TTS (step 227), and the process is done (step 228). If the answer is no, the process is done (step 228).

Figure 3:
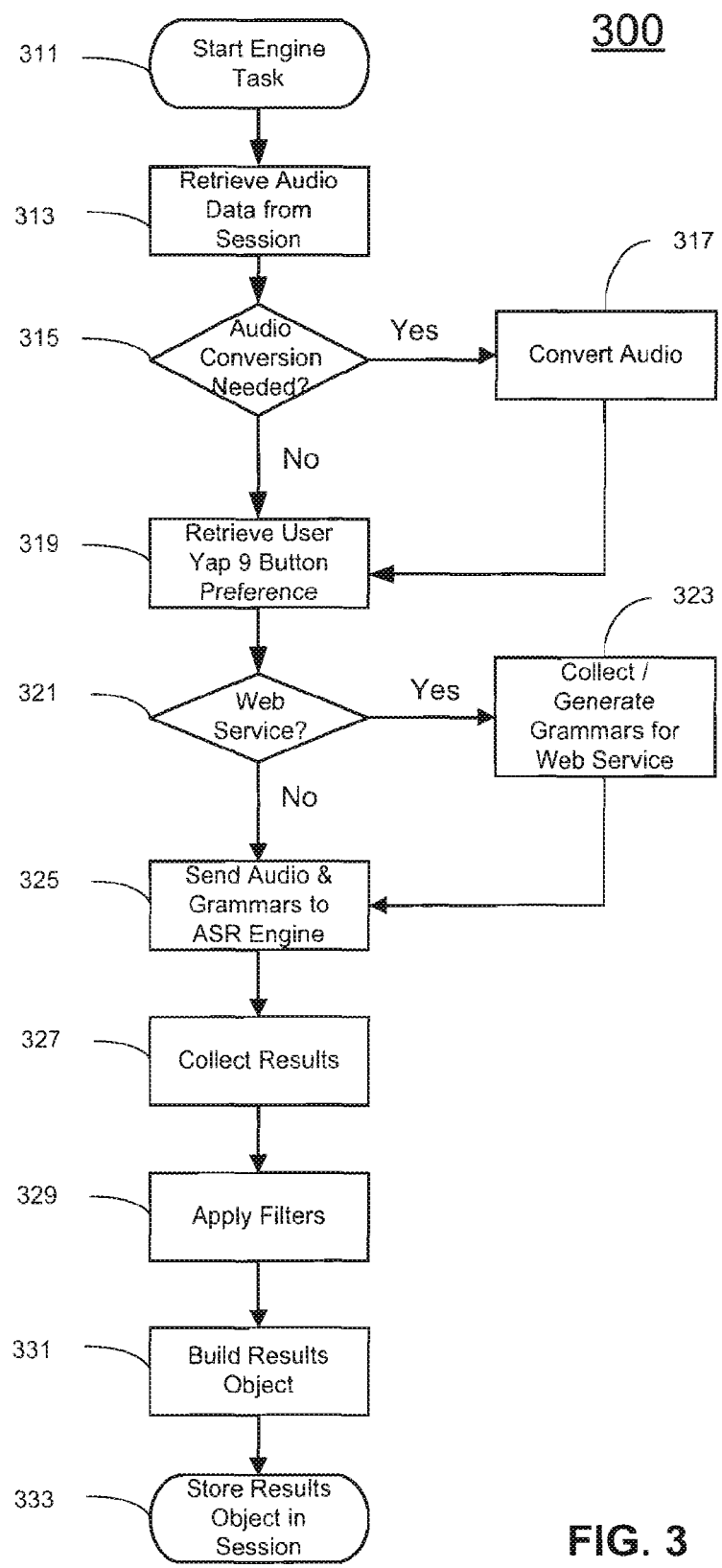
FIG. 3 shows a flowchart for converting an audio message into a text message according to one embodiment of the present invention.

FIG. 3 shows a flowchart for converting an audio message into a text message according to one embodiment of the present invention. At first, engine task is started (step 311), then audio data from session is retrieved at step 313. At step 315, the system checks whether audio conversion is needed. If the answer is no, the user Yap9 button preferences are retrieved at step 319. If the answer is yes, the engine will convert the audio message at step 317, then the user Yap9 button preferences are retrieved at step 319. Each user can configure their phones to use a different service (or Yapplet) for a particular Yap9 button. Theses preferences are stored in a database on the backend server. At next step (step 321), the system checks whether the request is for a web service. If the answer is no, audio and grammars are sent to the ASR engine at step 325, otherwise, grammar is collected/generated for the web service at step 323, then the audio and grammars are sent to the ASR engine at step 325. At step 327, the results are collected. Then filters are applied to the results at step 329. There are a number of filters that can be applied to the transcribed text. Some can be user configured (such as SMS, or date), and others will always be applied (like the advertisement filter). At step 331, results object is built, and then the results object is stored in session at step 333.

Figure 4:
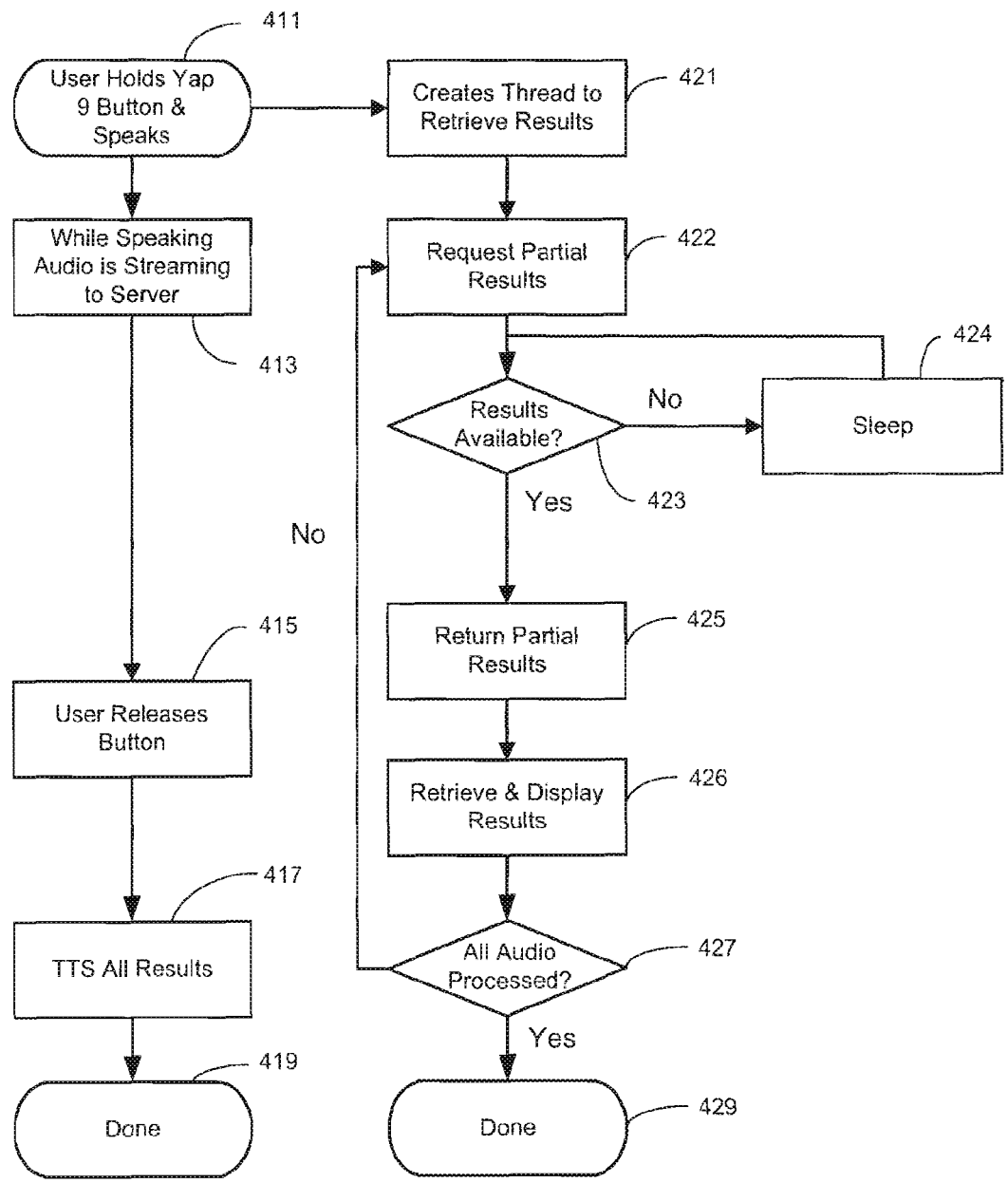
FIG. 4 shows a flowchart of a speech recognition engine that uses streaming to begin recognizing/converting speech into text before the user has finished speaking according to one embodiment of the present invention.

FIG. 4 shows a flowchart 400 of a speech recognition engine that uses streaming to begin recognizing/converting speech into text before the user has finished speaking according to one embodiment of the present invention. At first (step 411), a user holds Yap9 button of the phone and speaks. Then the audio is streaming to the server while speaking (step 413). At step 415, the user releases the button, which triggers the server to TTS all results at step 417, then is done (step 419). Alternatively, when the user holds Yap9 button of the phone and speaks at step 411, a thread is created to retrieve results (step 421). Then partial results are request at step 422. At step 423, it is determined whether the results are available. If the results are not available, the server goes to sleep at step 424. Otherwise, the partial results are returned at step 425. Then the results are retrieved and displayed on the phone at step 426. At step 427, it is determined whether all audio messages are processed. If yes, it will end the process (step 428). Otherwise, it goes back to step 422, at which the partial results are requested.

Figure 5:
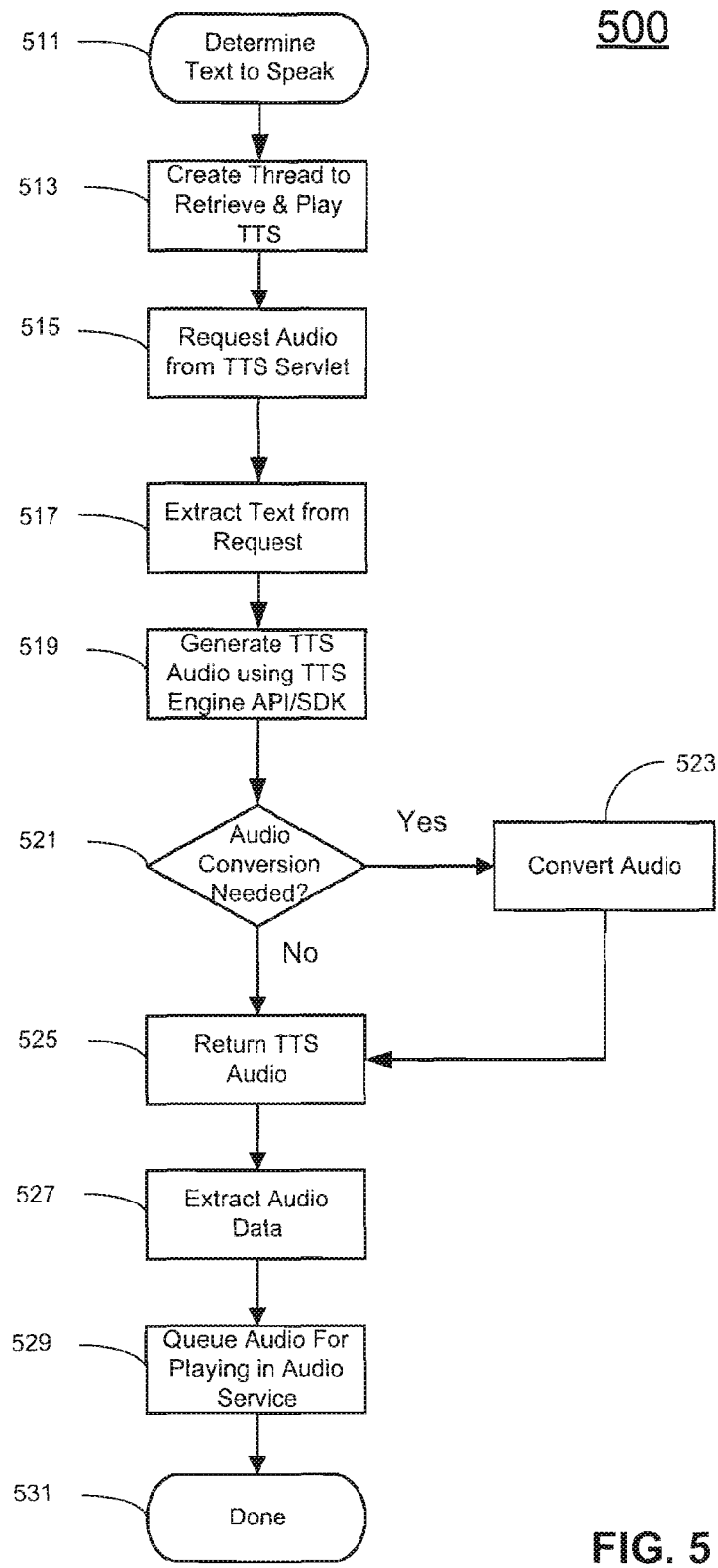
FIG. 5 shows a flowchart of converting a text message to an audio message according to one embodiment of the present invention.

FIG. 5 shows a flowchart 500 of converting a text message to an audio message according to one embodiment of the present invention. At start, the server determines whether to convert text to speech (step 511), then a thread is created to retrieve and play TTS at step 513. At step 515, the audio message is requested from a TTS Servlet by the phone. Then, the text from the request is extracted at step 517. At step 519, the TTS audio message is generated using the TTS engine API/SDK. At step 521, it is determined whether the audio conversion is needed. If needed, the audio message is converted at step 523, and then the TTS audio message is returned at step 525. Otherwise, step 525 is performed. The audio data is extracted at step 527. Then the audio message for playing in audio service is queued at step 529. Then, the process finishes at step 531.

Figure 6A:
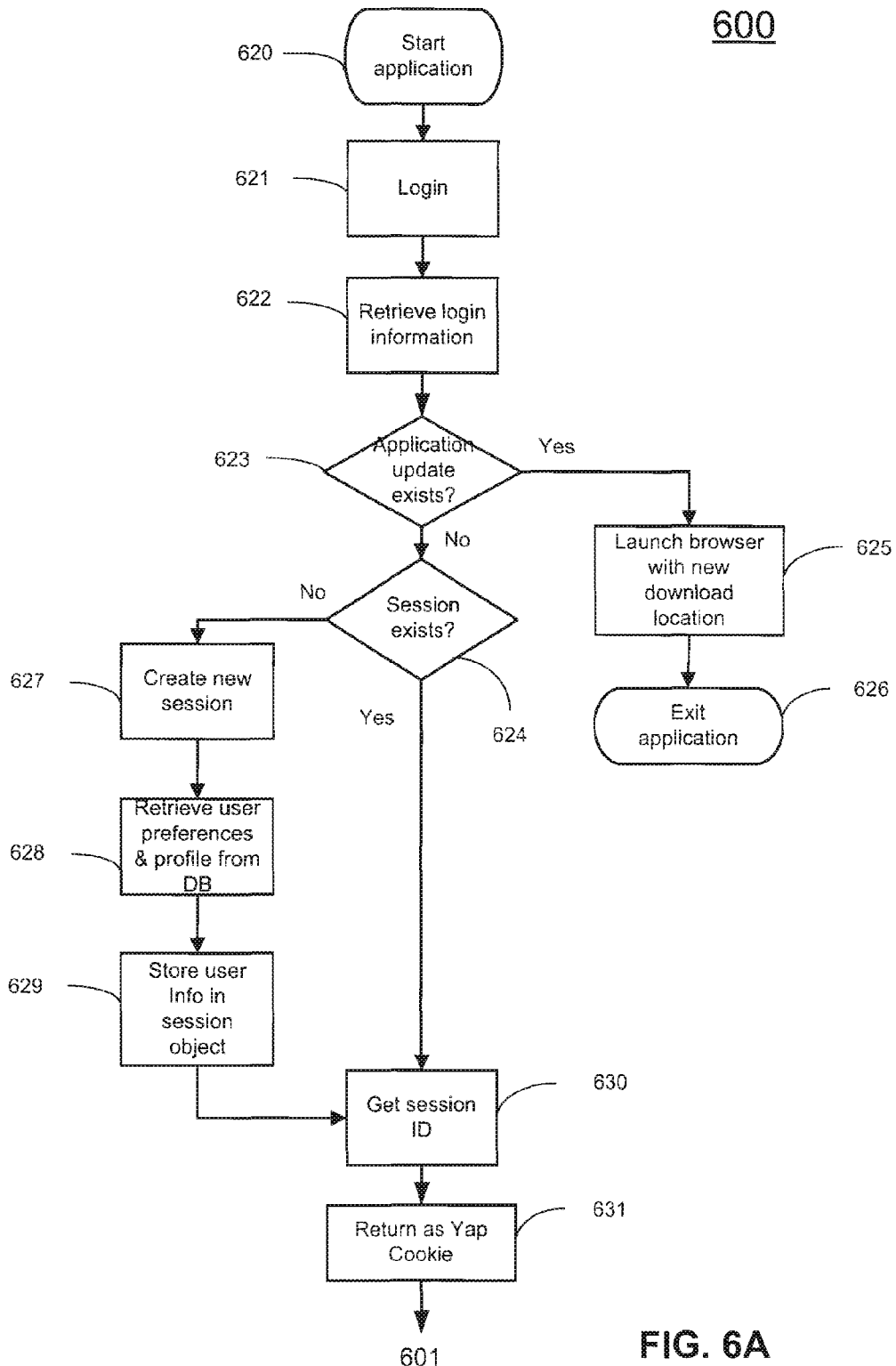
FIGS. 6A-GH show a flowchart for converting an audio message into a text message according to one embodiment of the present invention.

FIGS. 6A through 6H show a flowchart 600 for converting an audio message into a text message according to one embodiment of the present invention. As shown in FIG. 6A, at step 620, a user starts the system application on the client device. Then the user logs into his/her system account at step 621. The backend server retrieves the login information at step 622. At step 623, the backend server checks whether application updates exist. If yes, the server launches browser with new download location at step 625. After updated, the server exits the application (step 626). If the application updates do not exist, the server checks whether a session exists at step 624. If the session exists, the server gets the session ID at step 630. If the session does not exist, the server creates a new session at step 627, retrieves the user preferences and profile from the database at step 628, stores the user information in the session object at step 629, and then gets the session ID at step 630.

Figure 6B:
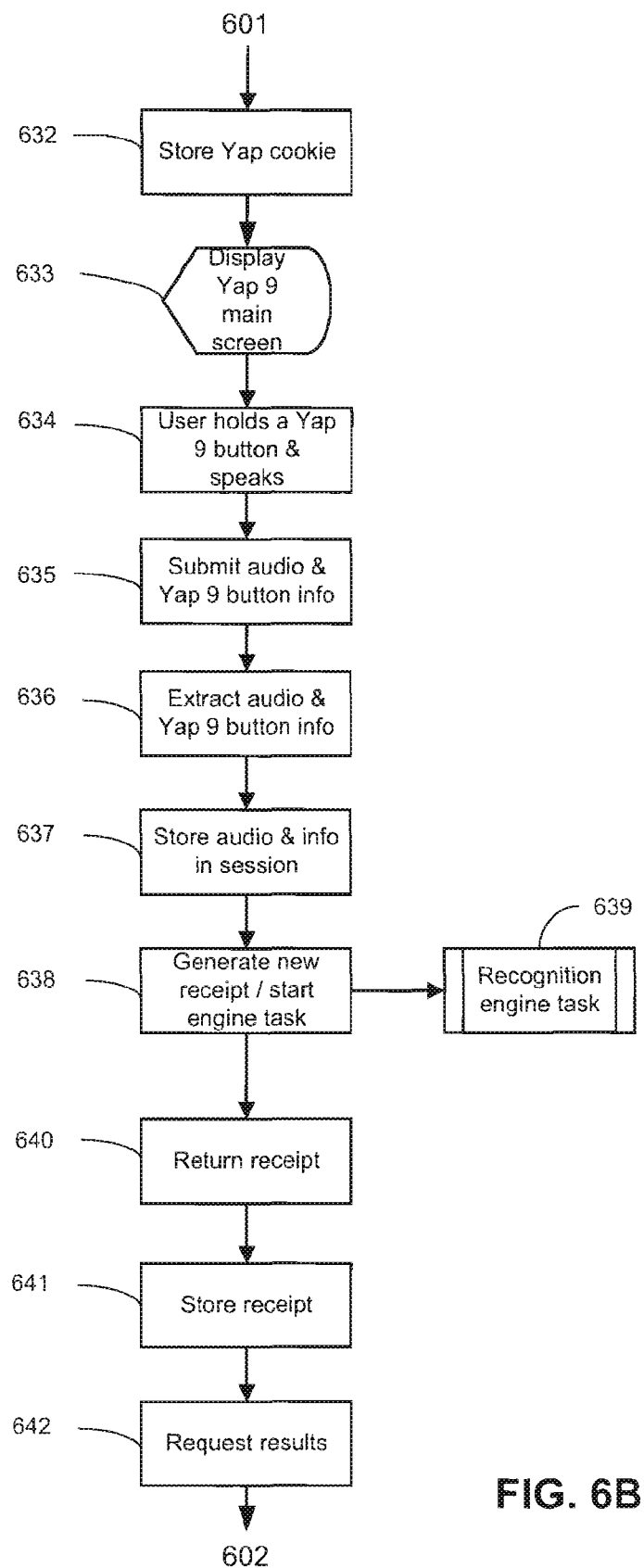

At step 631, Yap cookie is returned to the client device (mobile phone). Then the user holds Yap9 button and speaks at step 632, and submits the audio message and button information to the server at step 635. When received, the server then extracts the audio message and Yap9 button information at step 636, stores the audio message and Yap9 button information in the session at step 637, generates a new receipt and/or starts an engine task at step 638, and then performs the recognition engine task at step 639. At step 640, the server returns receipt to the client device. The client device stores the receipt at step 641 and requests the results at step 642, as shown in FIG. 6B.

Figure 6C:
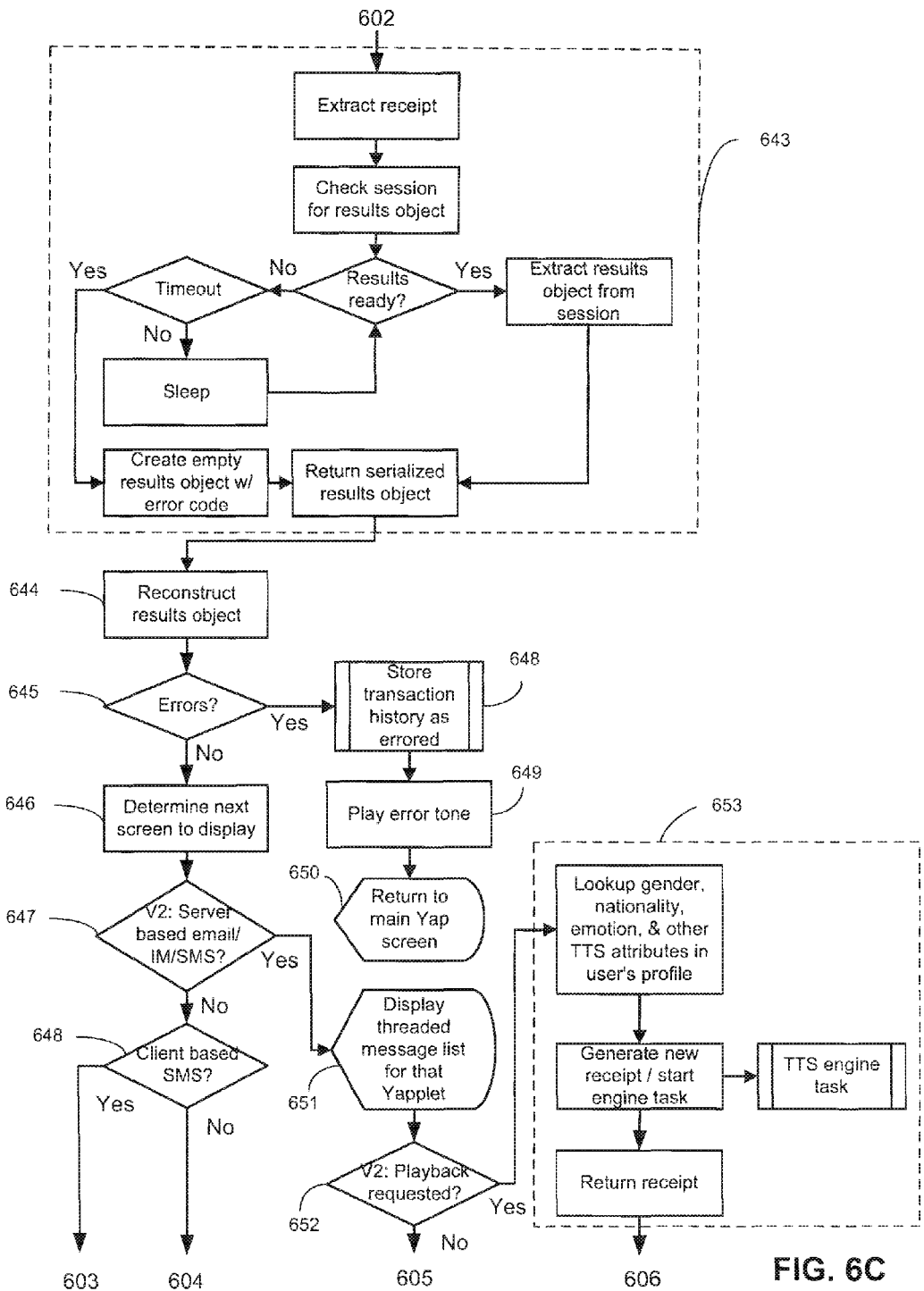

As shown in FIG. 6C, step 643 corresponds to a process block performed in the server, which extracts the receipt and returns the serialized results object to the client device. At step 644, the client device reconstructs the results object and checks if there are errors at step 645. If there are errors, the server stores the transaction history in an error status at step 648, and the client device plays an error tone at step 649 and returns to the main system user interface screen at step 650. If no error is found at step 645, the client device determines the next screen to display at step 646, then checks whether it is a server based email/IM/SMS at step 647. If it is not the server based email/IM/SMS, a further check is made to determine whether the request is for a client based SMS at step 648. If it is the server based email/IM/SMS, the client device displays a threaded message list for that Yapplet at step 651 and then checks whether the playback is requested at step 652.

If the playback is requested, the server performs step 653, a block process, which looks up gender, nationality, emotion, and other TTS attributes in the user's profile and returns receipt to the client device. If the playback is not requested at step 652, the client device displays the transcription results at step 657. At step 658, the user error correction is performed.

Figure 6D:
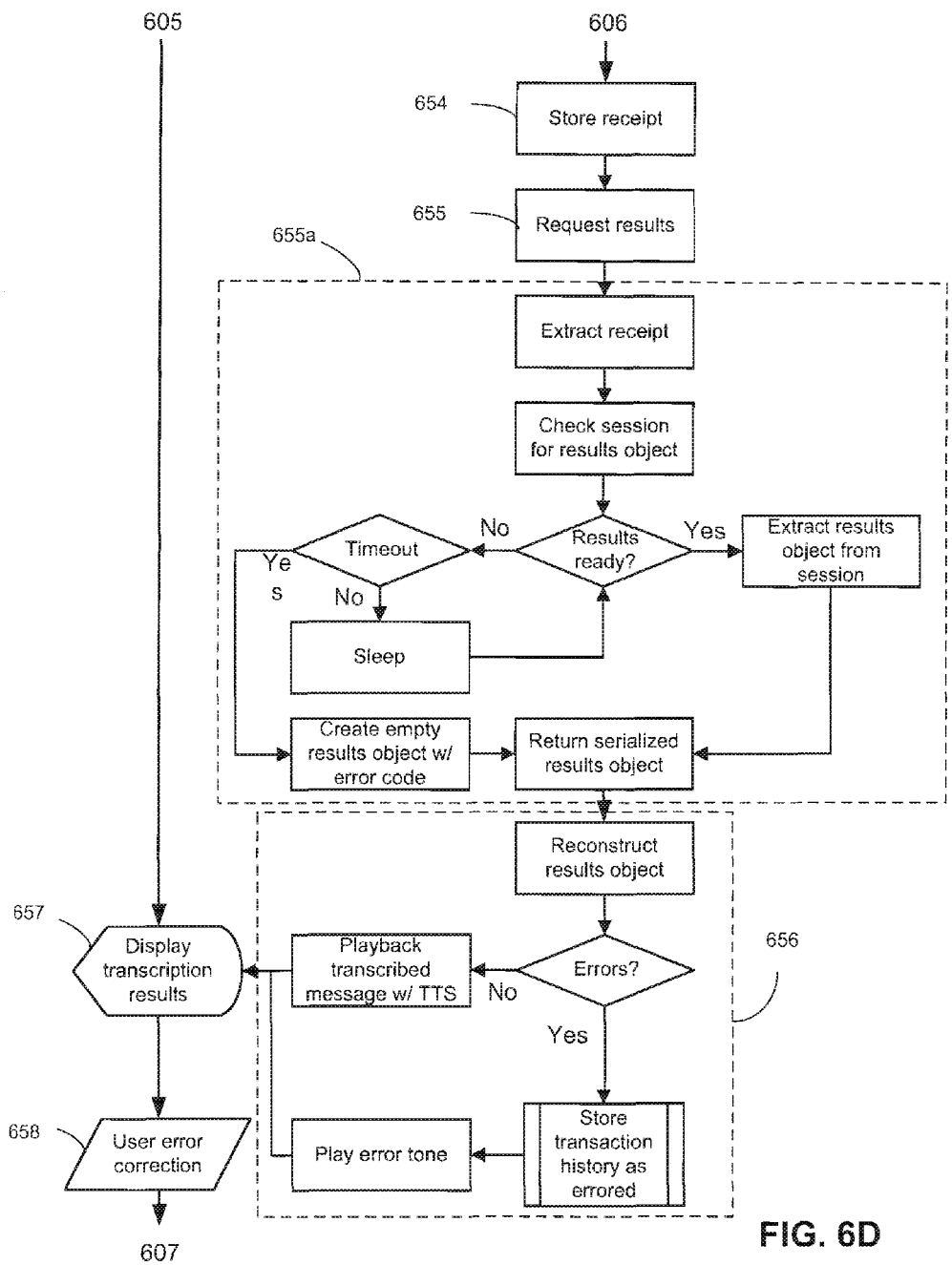

After step 653 is performed, the client device stores receipt at step 654 and requests the results at step 655. Then the server performs step 655a which is same as step 643. The server returns the serialized results object to the client device. The client device performs step 656 to reconstruct results objects, check errors and return to step 657 to display transcription results, as shown in FIG. 6D.

After step 658 is performed in the client device, the client device checks if the user selects a "send" or "cancel" at step 659. If the "cancel" is selected, the server stores the transaction history as cancelled at step 660. Then the client device plays a cancelled tone at step 661 and displays a threaded message list for that Yapplet at step 662. If the "send" is selected at step 659, the client device selects a proper gateway for completing the transaction at step 663, and sends through an external gateway at step 664. Afterward, the server stores the transaction history as successful at step 665. The client device then adds that new entry to the message stack for that Yapplet at step 666, plays a sent tone at step 667 and displays the threaded message list for that Yapplet at step 668, as shown in FIG. 6E.

Figure 6E:
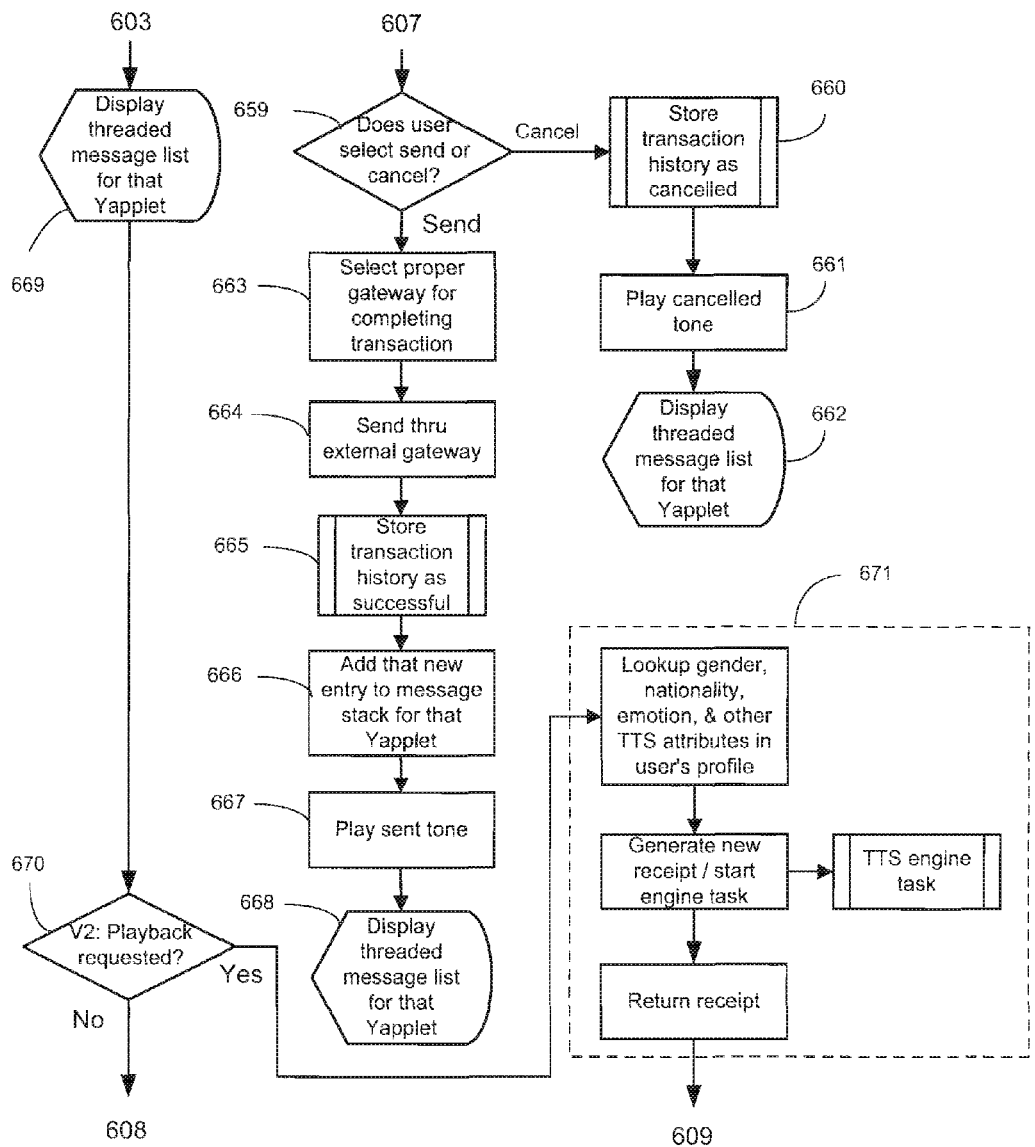

At step 648, as shown in FIG. 6C, if the request is for a client based SMS, the client device displays the threaded message list for that Yapplet at step 663, as shown in FIG. 6E, then checks whether a playback is requested at step 664. If the playback is requested, the server run a block process 665, which is same as the process 653, where the server looks up gender, nationality, emotion, and other TTS attributes in the user's profile and returns receipt to the client device. If the playback is not requested at step 664, the client device displays the transcription results at step 676. At step 677, the user error correction is performed.

Figure 6F:
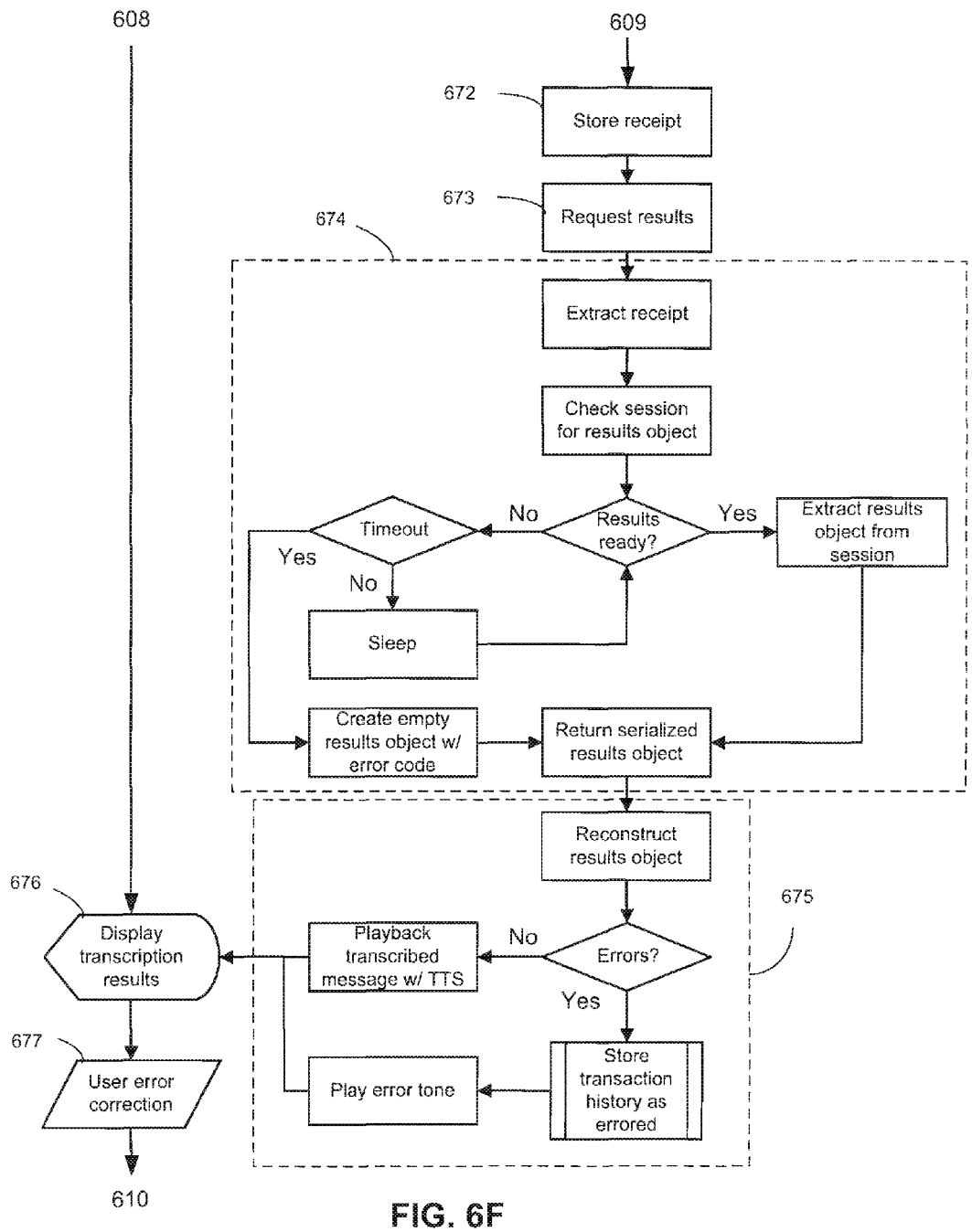

After step 671 is performed, as shown in FIG. 6E, the client device stores receipt at step 672 and requests the results at step 673. Then the server performs step 674 which is same as step 643. The server returns the serialized results object to the client device. The client device then performs step 675 to reconstruct results objects, check errors and return to step 676 to display transcription results, as shown in FIG. 6F.

Figure 6G:
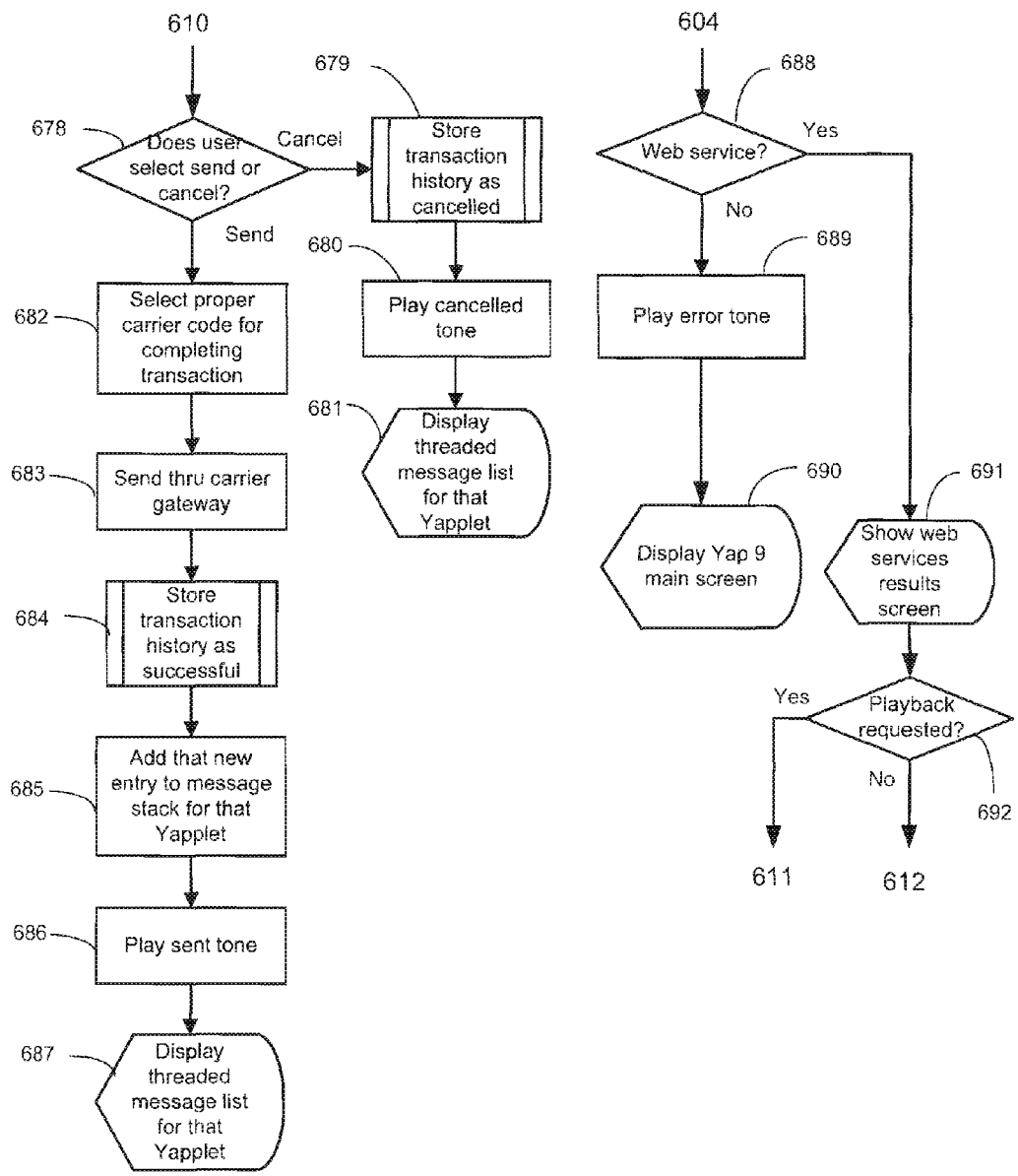

After step 677 is performed in the client device, the client device checks if the user selects a "send" or "cancel" at step 678. If the "cancel" is selected, the server stores the transaction history as cancelled at step 679. Then the client device plays a cancelled tone at step 680 and displays a threaded message list for that Yapplet at step 681. If the "send" is selected at step 678, the client device selects a proper gateway for completing the transaction at step 683, and sends through an external gateway at step 683. Afterward, the server stores the transaction history as successful at step 684. The client device then adds that new entry to the message stack for that Yapplet at step 685, plays a sent tone at step 686 and displays the threaded message list for that Yapplet at step 687, as shown in FIG. 6G.

Figure 6H:
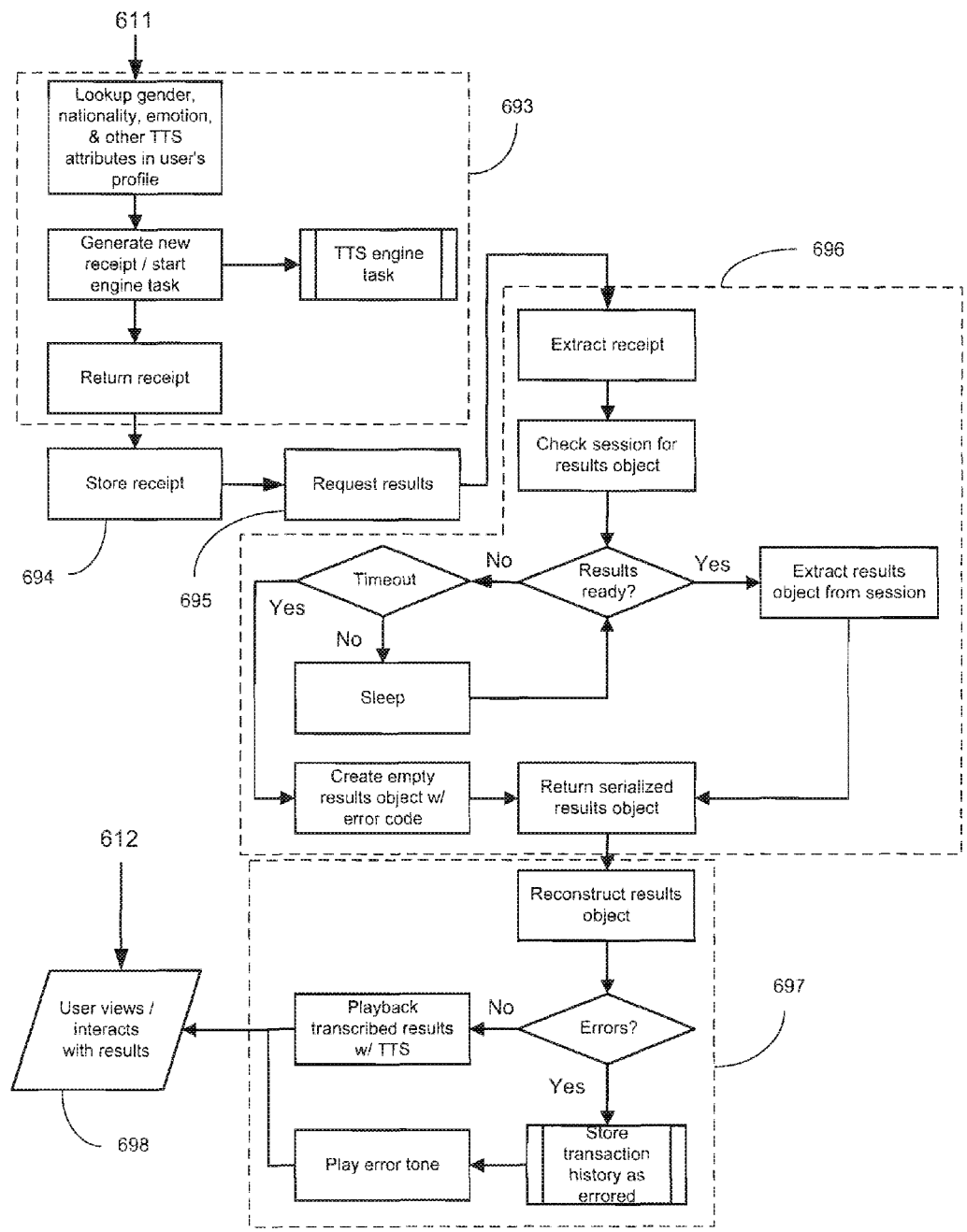

After step 648, as shown in FIG. 6C, if the request is not for a client based SMS, the client device further checks whether the request is a web service at step 688. If it is not a web service, the client device pays an error tone at step 689 and displays the Yap9 main screen at step 690. If it is a web service, the client device show the web service result screen at step 691 and then checks whether a playback is requested at step 692. If no playback is requested, the user views and/or interacts with the results at step 698. If a playback is requested at step 692, the server perform a block process 693, which is same as the process 653 shown in FIG. 6C, to look up gender, nationality, emotion, and other TTS attributes in the user's profile and return receipt to the client device. The client device stores the receipt at step 694 and requests the results at step 695. Then, the server runs the process 696, which is the same as the process 643 shown in FIG. 6C, to return the serialized results object to the client device. The client device then performs step 697 to reconstruct results objects, check errors and return to step 698 where the user views and/or interacts with the results, as shown in FIG. 6H.

Figure 7:
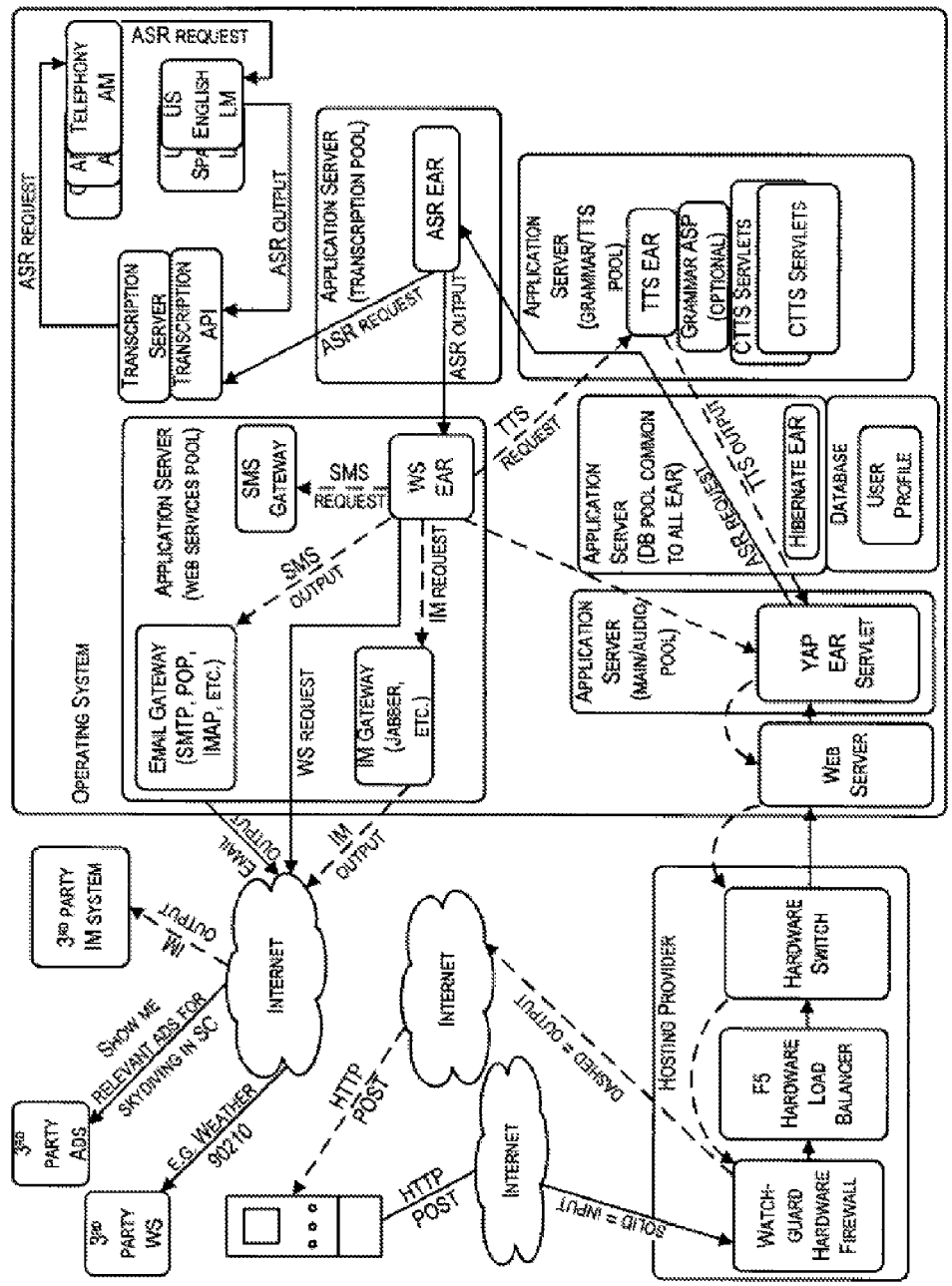
FIG. 7 shows schematically architecture of the system according to one embodiment of the present invention.

FIG. 7 schematically illustrates the architecture of the system according to one embodiment of the present invention.

Figure 8:
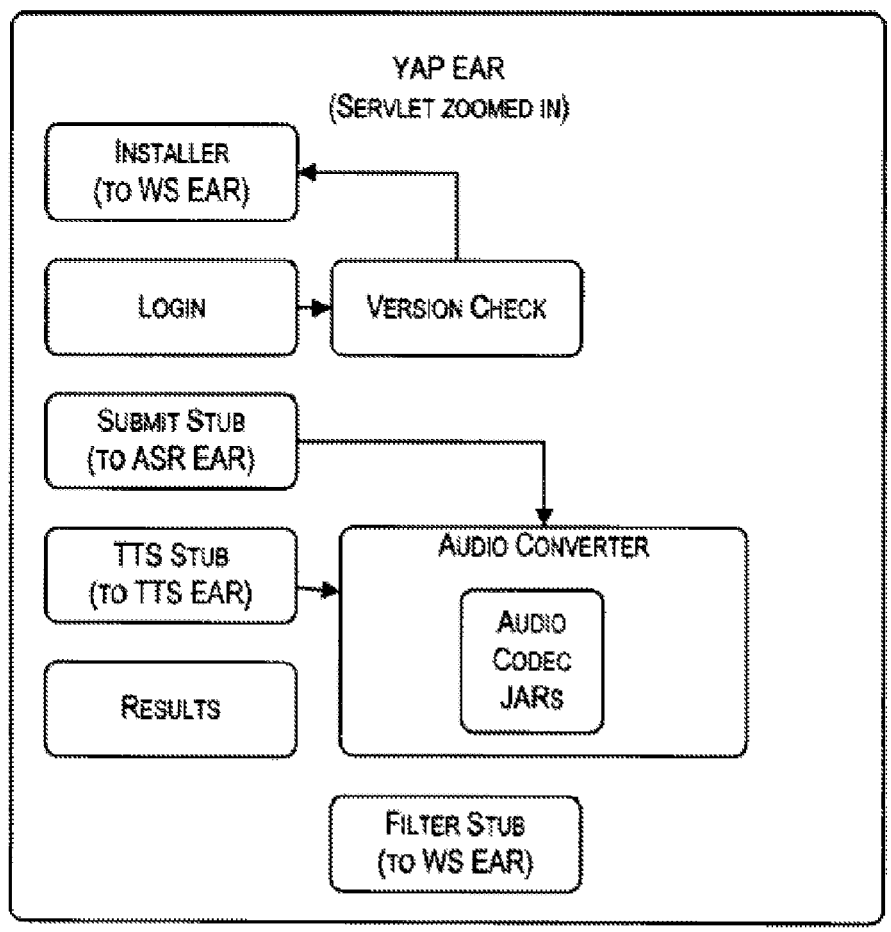
FIG. 8 shows a flowchart of Yap EAR of the system according to one embodiment of the present invention.

FIG. 8 shows a flowchart of Yap EAR according to one embodiment of the present invention.

Figure 9:
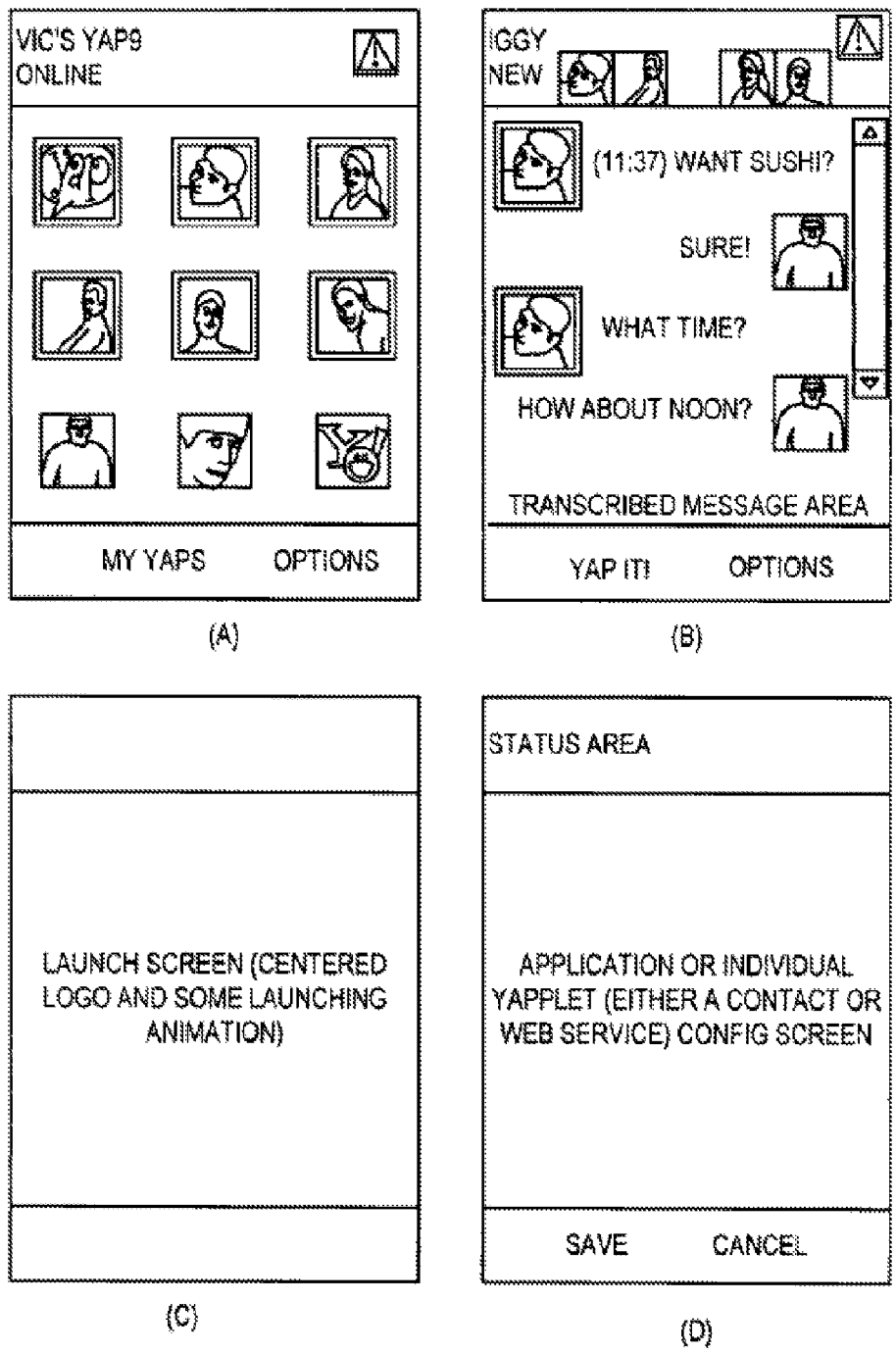
FIG. 9 shows a user interface of the system according to one embodiment of the present invention.

In one embodiment of the present invention, a user interface (UI) uniquely suited for mobile environments is disclosed, as shown in FIG. 9. In this exemplary UI, "Yap9" is a combined UI for short message service (SMS), instant messaging (IM), email messaging, and web services (WS) ("Yapplets").

Home Page

When first opening the application, the user is greeted with "Yap on!" (pre-recorded/embedded or dynamically generated by a local/remote TTS engine) and presented a list of their favorite 9 messaging targets, represented by 9 images in squares shown in FIG. 9A. These can be a combination of a system account, cell phone numbers (for SMS), email addresses, instant messaging accounts, or web services (Google, Yahoo!, etc.).

On all screens, a logo or similar branding is preferably presented on the top left, while the microphone status is shown on the top right.

From this page, users are able to select from a list of default logos and their constituent web services or assign a picture to each of their contacts. In this example, "1" is mapped to a system account, "2" is mapped to Recipient A's cell phone for an SMS, and "9" is mapped to Yahoo! Local. Each one of these contacts has a color coded status symbol on this screen, for example, Red: no active or dormant conversation;
Blue: dormant conversation;
Yellow: transcription ready to send;
Green: new message or result received.

The overall theme/color is configurable and can be manually or automatically changed for branding by third parties. In addition, it can respond to external conditions, with examples including local weather conditions, nearby advertisers, or time of day/date using a JSR, similar mobile API, or carrier-specific location based services (LBS) APIs.

Instead of a small dot, the space between the icon and the elements is used to color the status, so it is easier to see. The user is able to scroll through these boxes using the phones directional pad and select one by pressing in. An advertising area is reserved above and below the "Yap9" list.

When a user selects a square and click options, the UI rotates to reveal a configuration screen for that square. For example, "my Yaps" takes the user to a list of last 50 "Yaps" in threaded view. "Yap it!" sends whatever is in the transcribed message area. Tapping "0" preferably takes the user back to the "home page" from any screen within the system, and pressing green call/talk button preferably allows the user to chat with help and natural language understanding (NLU) router for off-deck applications.

In the "Home" screen, the right soft button opens an options menu. The first item in the list is a link to send the system application to a friend. Additional options include "Configuration" and "Help". The left soft button links the user to the message stream. In the Home page, pressing "*" preferably key takes the user to a previous conversation, pressing "#" key preferably takes the user to the next conversation, and '0' preferably invokes the 2nd and further levels of "Yap9"s.

Messaging

The primary UI is the "Yap9" view, and the second is preferably a threaded list of the past 50 sent and received messages in a combined view, and attributed to each user or web service. This is pulled directly out and written to the device's SMS inbox and outbox via a JSR or similar API. This also means that if they delete their SMS inbox and outbox on the device, this is wiped out as well.

For the threaded conversations, the user's messages are preferably colored orange while all those received are blue, for example, as shown in FIG. 9B

Location Based Services

FIG. 9B shows a demonstration of the system application with streaming TTS support. The default action, when a user clicks on an entry, is to show the user a profile of that location. The left menu button preferably takes the user home (without closing this results list) with the right button being an options menu:

Send it
Dial it
Map it

Directions from my location (either automatically gets it via JSR 179, a carrier or device specific API, or allows the user to select a source location).

If the user chooses the same location twice in an LBS query, it is marked as the category favorite automatically with a star icon added next to that entry (it can be unstarred under the options menu later). In this way, others in the address book of User A are able to query for User A's preferences. For example, User A may search for a sushi restaurant and ultimately selects "Sushi 101". If User A later selects Sushi 101 when conducting a similar search at a later date, this preference will be noted in the system and User B could then query the system and ask: "What's User A's favorite sushi restaurant" and "Sushi 101" would be returned.

Using the GPS, a user's current location is published based on the last known query. A friend can then utter: "ask User A where are you?" to get a current map.

Personal Agent

Anywhere in the application, a user is able to press a number key that maps to each of these top 9 targets, so that they could be firing off messages to all of these users simultaneously. For example, pressing "0" and uttering "what can I say?" offers help audio or text-to-speech as well as a list of commands in graphical or textual formats. Pressing "0" and uttering "what can I ask about User X" will show a list of pre-defined profile questions that User X has entered into the system. For example, if User A hits the "0" key and asks: "what can I ask about User B?" (assuming User B is in the address book and is a user of the system). The system responds with a list of questions User B has answered:

"Favorite color"
"Pet's name"
"Shoe size"
"Favorite bands"
"University attended"

The user presses "0" again and asks, "ask [User B] for [his/her] favorite color". The system responds: "User B's favorite color is 'orange'". Basically, this becomes a fully personalized concierge.

Configuration Options

There are beginner and advanced modes to the application. The advanced mode is a superset of the beginner features.

The beginner mode allows a user to . . .
select from English, Spanish, or other languages mode, for both input and output; and
profile zip or postal codes and/or full addresses for home, work, school and other locations, if the current phone does not support JSR 179 or a proprietary carrier API for locking into the current GPS position.

The advanced mode allows a user to
turn off the "Yap on!" welcome greeting, "Yap sent!" prompt, Yap received dings or any other prompts;
turn off the TTS or audio for LBS, weather, news, etc.;
select the gender and nationality of the TTS (US male, US female, UK male, UK female, US Spanish male, US Spanish female, etc.);
turn off transcription and simply send the messages as an audio file via MMS or email attachments;
tell the application which default tab it should open (Home a.k.a. "Yap9", message stream, or a particular user or web service);
customize the sending and receiving text colors;
turn off ability for friends to check the current location; and
list the applications, transcription, TTS, and voice server IP addresses as well as a version number.

According to the present invention, application startup time is minimized considerably. Round trip times of about 2 seconds or less for grammar based queries. It is almost instantaneous. Round trip times of about 5 seconds of less for transcription based messages.

Since this is significantly slower than grammars, the system allows the user to switch to other conversations while waiting on a response. In effect, multiple conversations are supported, each with a threaded view. Each one of these conversations would not be batch processed. Preferably, they each go to a different transcription server to maximize speed. If the user remains in a given transcription screen, the result is streamed so that the user sees it being worked on.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A computer-implemented method comprising:
receiving, at a device, an audio input;
transmitting, to a server, data representing a first portion of the audio input, as the first portion is received at the device;
receiving, from the server, an identifier associated with the first portion of the audio input;
transmitting, to the server, the identifier and a request for partial speech recognition results determined from the first portion of the audio input; and
receiving, from the server, the partial speech recognition results determined from the first portion of the audio input, while a second portion of the audio input is being received at the device.

2. The computer-implemented method of claim 1, further comprising presenting the partial speech recognition results at the device, while the second portion of the audio input is being received at the device.

3. The computer-implemented method of claim 2, further comprising:
transmitting, to the server, data representing the second portion of the audio input, as the second portion is received at the device;
receiving, from the server, second partial speech recognition results determined from at least the second portion of the audio input; and
presenting the second partial speech recognition results at the device.

4. The computer-implemented method of claim 2, wherein the partial speech recognition results are presented using a text-to-speech engine.

5. The computer-implemented method of claim 1, wherein the device is configured to begin receiving the audio input when a button is pressed, and finish receiving the audio input when the button is released.

6. The computer-implemented method of claim 1, wherein the transmitting of the data representing the first portion to the server is performed by a first thread and the receiving of the partial speech recognition results from the server is performed by a second thread.

7. The computer-implemented method of claim 1, wherein the audio input comprises a plurality of spoken words and the partial speech recognition results comprise at least one word represented as text.

8. The computer-implemented method of claim 1, wherein the message is edited at the device before it is transmitted.

9. A non-transitory computer storage medium storing instructions that, when executed, cause a processor to:
   receive an audio input;
   transmit, to a server, data representing a first portion of the audio input, as the first portion is received;
   receive an identifier associated with the first portion of the audio input from the server;
   request the partial speech recognition results from the server using the identifier; and
   receive, from the server, the partial speech recognition results determined from the first portion of the audio input, while receiving a second portion of the audio input.

10. The non-transitory computer storage medium of claim 9, further comprising instructions that, when executed, cause a processor to present the partial speech recognition results while the second portion of the audio input is being received.

11. The non-transitory computer storage medium of claim 10, further comprising instructions that, when executed, cause a processor to:
   transmit, to the server, data representing the second portion of the audio input, as the second portion is received;
   receive, from the server, second partial speech recognition results determined from at least the second portion of the audio input; and
   present the second partial speech recognition results.

12. The non-transitory computer storage medium of claim 10, wherein the partial speech recognition results are presented using a text-to-speech engine.

13. The non-transitory computer storage medium of claim 9, further comprising instructions that, when executed, cause a processor to begin receiving the audio input when a button is pressed, and finish receiving the audio input when the button is released.

14. The non-transitory computer storage of claim 9, wherein the audio input comprises a plurality of spoken words and the partial speech recognition results comprise at least one word represented as text.

15. The non-transitory computer storage medium of claim 9, wherein the transmitting of data representing the first portion to the server is performed by a first thread and the receiving of the partial speech recognition results from the server is performed by a second thread.

16. The non-transitory computer storage medium of claim 9, further comprising instructions that, when executed, cause a processor to receive commands for editing the message before it is transmitted.

17. A mobile apparatus comprising:
   memory configured to store audio input; and
   a processor in communication with the memory, the processor configured to:
      receive an audio input;
      transmit, to a server, data representing a first portion of the audio input, as the first portion is received;
      receive an identifier associated with the first portion of the audio input from the server;
      request the partial speech recognition results from the server using the identifier; and
      receive, from the server, the partial speech recognition results determined from the first portion of the audio input, while receiving a second portion of the audio input.

18. The mobile apparatus of claim 17, wherein the processor is further configured to present the partial speech recognition results while the second portion of the audio input is being received.

19. The mobile apparatus of claim 18, wherein the processor is further configured to:
   transmit, to the server, data representing the second portion of the audio input, as the second portion is received;
   receive, from the server, second partial speech recognition results determined from at least the second portion of the audio input;
   and present the partial speech recognition results.

20. The mobile apparatus of claim 18, wherein the partial speech recognition results are presented using a text-to-speech engine.

21. The mobile apparatus of claim 17, wherein the processor is further configured to begin receiving the audio input when a button is pressed, and finish receiving the audio input when the button is released.

22. The mobile apparatus of claim 17, wherein the processor is further configured to transmit the data representing the first portion to the server using a first thread and receive the partial speech recognition results from the server using a second thread.

23. The mobile apparatus of claim 17, wherein the audio input comprises a plurality of spoken words and the partial speech recognition results comprise at least one word represented as text.

24. The mobile apparatus of claim 17, wherein the processor is further configured to receive commands for editing the message before it is transmitted.

\* \* \* \* \*

UNITED STATES PATENT AND TRADEMARK OFFICE
CERTIFICATE OF CORRECTION

PATENT NO. : 9,009,055 B1  
APPLICATION NO. : 13/872928  
DATED : April 14, 2015  
INVENTOR(S) : Victor R. Jablokov et al.

Page 1 of 2

It is certified that error appears in the above-identified patent and that said Letters Patent is hereby corrected as shown below:

On the title page

In column 2 (page 3, item 56) at line 29, Under Other Publications, change "www.orionserever.com" to --www.orionserver.com--.

In column 2 (page 3, item 56) at line 37, Under Other Publications, change "htt;://" to --http://--.

In the drawings

Sheet 10 of 16 (Reference Numeral 664, FIG. 6E) at line 1, Change "thru" to --through--.

Sheet 12 of 16 (Reference Numeral 683, FIG. 6G) at line 1, Change "thru" to --through--.

In the specification

In column 1 at line 21, Change "filed filed" to --filed--.

In column 2 at line 23, Change "handheld" to --hand-held--.

In column 5 at line 21, Change "6A-GH" to --6A-H--.

In column 10 at line 1, Change "Yap,,com" to --Yap.com--.

In column 10 at line 35, Change "f4etbFaBXegwFAOSjElttlO" to --f4etbFaBXegwFA0SjE1ttlO--.

In column 11 at line 34, Change "C2403217F2351E3C420A59930878371A" to --C240B217F2351E3C420A599B0878371A--.

In column 11 at line 58, Change ""Yaplet"" to --"Yapplet"--.

In column 12 at line 65, Change "Yaplets" to --Yapplets--.

In column 18 at lines 41-46, Delete ""Configuration" . . . "Yap9"s." and insert the same Col. 18, Line 40, as the continuation of the same paragraph.

In column 18 at line 57, Change "9B" to --9B.--.

Signed and Sealed this  
Fifth Day of January, 2016

Michelle K. Lee  
*Director of the United States Patent and Trademark Office*

CERTIFICATE OF CORRECTION (continued)
U.S. Pat. No. 9,009,055 B1

In the claims

In column 21 at line 44, In Claim 14, after "storage" insert --medium--.

In column 22 at line 32 (approx.), In Claim 19, after "the" insert --second--.